United States Patent
Shimazawa et al.

(10) Patent No.: US 8,441,895 B2
(45) Date of Patent: May 14, 2013

(54) THERMALLY-ASSISTED MAGNETIC RECORDING HEAD WITH LIGHT DETECTOR IN ELEMENT-INTEGRATION SURFACE

(75) Inventors: Koji Shimazawa, Tokyo (JP); Seiichi Takayama, Tokyo (JP); Eiji Komura, Tokyo (JP); Osamu Shindo, Tokyo (JP); Takashi Honda, Shatin (HK)

(73) Assignee: TDK Corporation, Tokyo (JP)

( * ) Notice: Subject to any disclaimer, the term of this patent is extended or adjusted under 35 U.S.C. 154(b) by 396 days.

(21) Appl. No.: 12/622,962

(22) Filed: Nov. 20, 2009

(65) Prior Publication Data

US 2011/0122737 A1    May 26, 2011

(51) Int. Cl.
*G11B 11/00*    (2006.01)
(52) U.S. Cl.
USPC ................................ 369/13.33; 369/13.13
(58) Field of Classification Search .............. 369/13.33, 369/13.13, 13.32, 13.02, 112.09, 112.14, 369/112.21, 112.27; 360/59; 385/129, 31, 385/88–94; 250/201.3, 201.5
See application file for complete search history.

(56) References Cited

U.S. PATENT DOCUMENTS

| | | | |
|---|---|---|---|
| 4,860,276 A | 8/1989 | Ukita et al. | |
| 5,793,790 A | 8/1998 | Doi et al. | |
| 5,946,281 A | 8/1999 | Ito et al. | |
| 7,330,404 B2 | 2/2008 | Peng et al. | |
| 7,454,095 B2 | 11/2008 | Baehr-Jones et al. | |
| 7,538,978 B2 | 5/2009 | Sato et al. | |
| 2005/0213436 A1 | 9/2005 | Ono et al. | |
| 2008/0002298 A1 | 1/2008 | Sluzewski | |
| 2008/0043360 A1 | 2/2008 | Shimazawa et al. | |
| 2008/0056073 A1 | 3/2008 | Shimizu | |
| 2008/0204916 A1* | 8/2008 | Matsumoto et al. | 369/13.33 |
| 2009/0165285 A1* | 7/2009 | Takayama et al. | 29/603.09 |
| 2010/0238580 A1* | 9/2010 | Shimazawa et al. | 369/13.33 |
| 2011/0216635 A1* | 9/2011 | Matsumoto | 369/13.33 |

FOREIGN PATENT DOCUMENTS

JP    8-315434    11/1996

OTHER PUBLICATIONS

Michael Hochberg, et al., "Integrated Plasmon and dielectric waveguides" Optics Express, vol. 12, No. 22, Nov. 2004, pp. 5481-5486.
Mike Salib, et al. "Silicon Photonics", Intel Technology Journal, vol. 8, Issue 2, 2004, pp. 143-160.
U.S. Appl. No. 12/407,420, filed Mar. 19, 2009, Koji Shimazawa, et al.
Robert E. Rottmayer, et al. "Heat-Assisted Magnetic Recording" IEEE Transactions on Magnetics, vol. 42, No. 10, Oct. 2006, pp. 2417-2421.

* cited by examiner

*Primary Examiner* — Tan X Dinh
(74) *Attorney, Agent, or Firm* — Frommer Lawrence & Haug LLP

(57) ABSTRACT

A thermally-assisted magnetic recording head is provided, in which the light-source output can be adjusted according to its variation by environmental influences and over time. The head comprises: a light source; a write head element provided in a element-integration surface; an optical system provided in the element-integration surface and configured to guide a light emitted from the light source to the vicinity of one end of the write head element; and a light detector for monitoring the light-source output, provided in the element-integration surface and comprising a light-receiving surface covering an area directly above at least a portion of the optical system. This light detector with such a light-receiving surface can detect a leakage light emitted from the optical system as a monitoring light. Therefore, feedback adjustment of the light-source output can be realized to stabilize the intensity of light for thermal-assist applied to a magnetic recording medium.

18 Claims, 13 Drawing Sheets

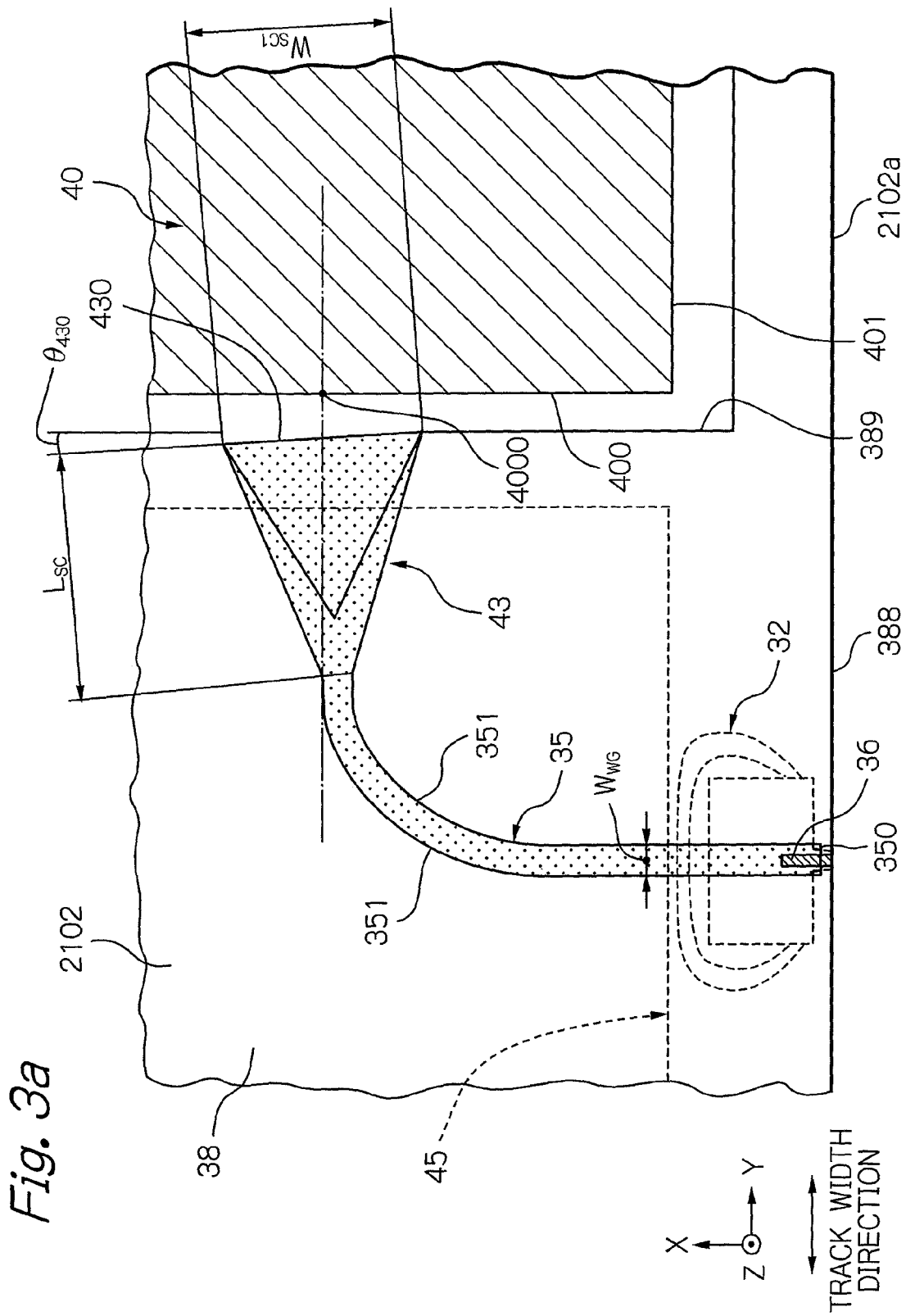

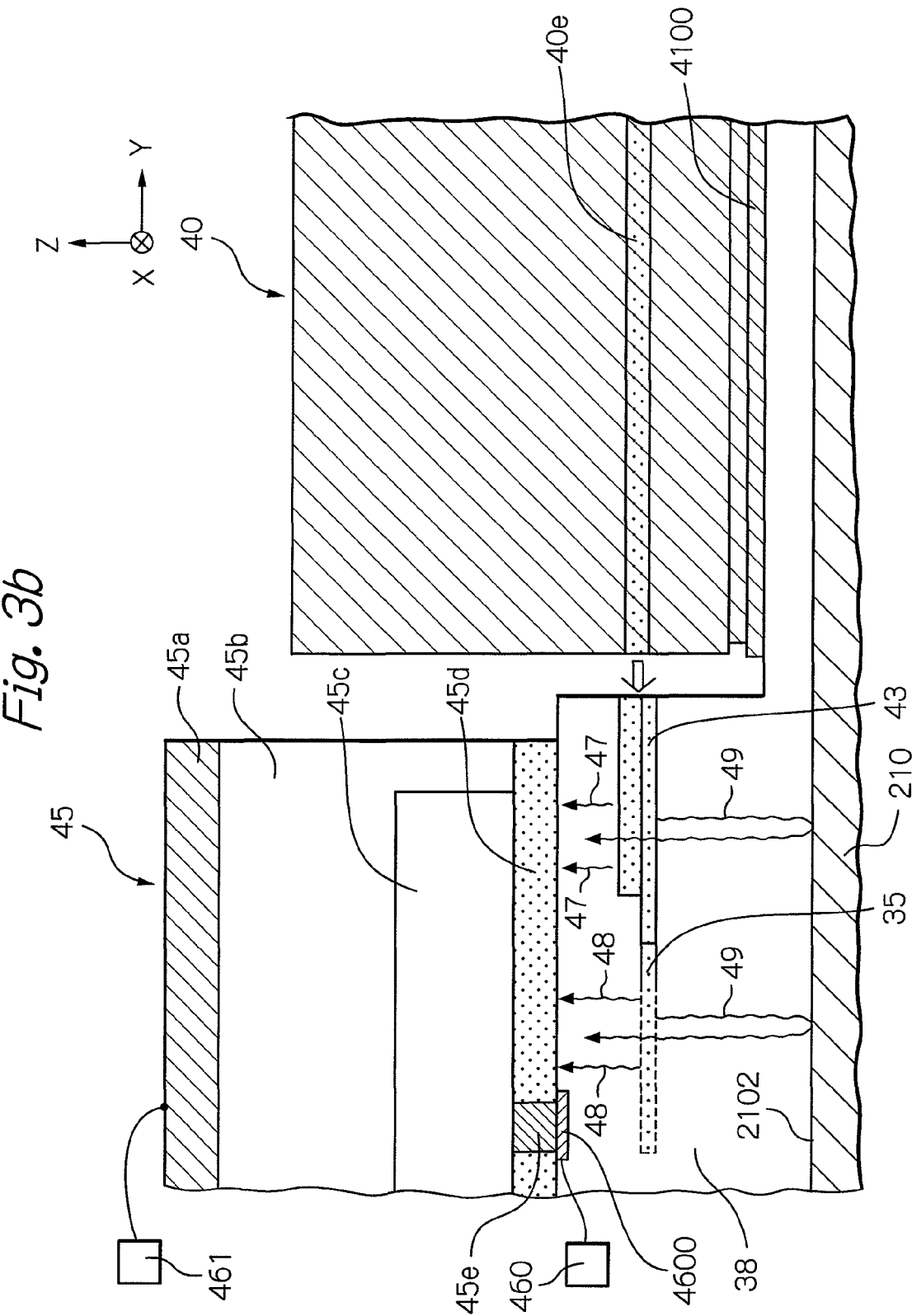

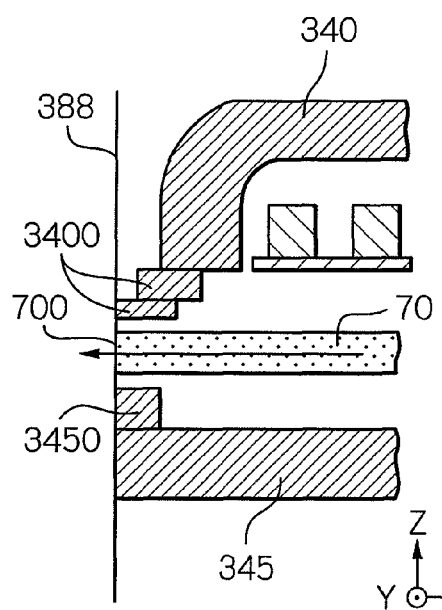 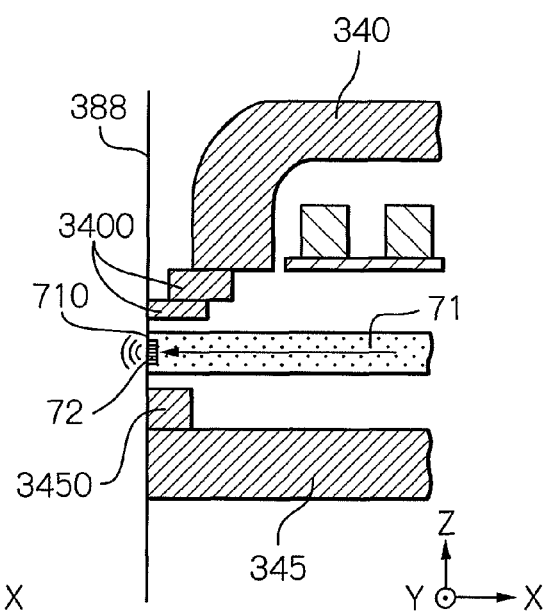

Fig. 12

THERMALLY-ASSISTED MAGNETIC RECORDING HEAD WITH LIGHT DETECTOR IN ELEMENT-INTEGRATION SURFACE

BACKGROUND OF THE INVENTION

1. Field of the Invention

The present invention relates to a magnetic recording head used for thermally-assisted magnetic recording in which a magnetic recording medium is irradiated with light, thereby anisotropic magnetic field of the medium is lowered, thus data can be written. Further, the present invention relates to a head gimbal assembly (HGA) provided with the head, and to a magnetic recording apparatus provided with the HGA. Furthermore, the present invention relates to a control of light-emitting operation of a light source that emits light for thermal-assist, and to a method for screening thermally-assisted magnetic recording heads.

2. Description of the Related Art

As the recording densities of magnetic recording apparatuses become higher, as represented by magnetic disk apparatuses, further improvement has been required in the performance of thin-film magnetic heads and magnetic recording media. As the thin-film magnetic heads, a composite-type thin-film magnetic head is widely used, which has a stacked structure of a magnetoresistive (MR) element for reading data and an electromagnetic transducer for writing data.

Whereas, the magnetic recording media are generally a kind of discontinuous body of magnetic grains gathered together, and each of the magnetic grains has a single magnetic domain structure. Here, one record bit consists of a plurality of the magnetic grains. Therefore, in order to improve the recording density, it is necessary to decrease the size of the magnetic grains and reduce irregularity in the boundary of the record bit. However, the decrease in size of the magnetic grains raises a problem of degradation in thermal stability of the magnetization due to the decrease in volume.

As a measure against the thermal stability problem, it may be possible to increase the magnetic anisotropy energy $K_U$ of the magnetic grains. However, the increase in energy $K_U$ causes the increase in anisotropic magnetic field (coercive force) of the magnetic recording medium. Whereas, the intensity of write field generated from the thin-film magnetic head is limited almost by the amount of saturation magnetic flux density of the soft-magnetic material of which the magnetic core of the head is formed. As a result, the head cannot write data to the magnetic recording medium when the anisotropic magnetic field of the medium exceeds the write field limit.

Recently, as a method for solving the problem of thermal stability, so-called a thermally-assisted magnetic recording technique is proposed. In the technique, a magnetic recording medium formed of a magnetic material with a large energy $K_U$ is used so as to stabilize the magnetization, then anisotropic magnetic field of a portion of the medium, where data is to be written, is reduced by heating the portion; just after that, writing is performed by applying write field to the heated portion.

In this thermally-assisted magnetic recording technique, there has been generally used a method in which a magnetic recording medium is irradiated and thus heated with a light such as near-field light. In this case, it is significantly important to stably supply a light with a sufficiently high intensity at a desired position on the magnetic recording medium. However, from the beginning, more significant problem to be solved exists in where and how a light source with a sufficiently high output of light should be disposed inside a head.

As for the setting of the light source, for example, U.S. Pat. No. 7,538,978 B2 discloses a configuration in which a laser unit including a laser diode is mounted on the back surface of a slider, and UP Patent Publication No. 2008/0056073 A1 discloses a configuration in which a structure of a laser diode element with a monolithically integrated reflection mirror is mounted on the back surface of a slider. Further, UP Patent Publication No. 2005/0213436 A1 discloses a structure of slider that is formed together with a semiconductor laser, and Robert E. Rottmayer et al. "Heat-Assisted Magnetic Recording" IEEE TRANSACTIONS ON MAGNETICS, Vol. 42, No. 10, p. 2417-2421 (2006) discloses a configuration in which a diffraction grating is irradiated with a light generated from a laser unit provided within a drive apparatus. Further, UP Patent Publication No. 2008/0002298 A1 and U.S. Pat. No. 5,946,281 A disclose heads in which a surface-emitting laser diode as a light source is disposed in the element-integration surface of a slider substrate.

While various types of installations of light sources as described above have been proposed, all of those laser diodes are semiconductor devices. Outputs of semiconductor devices vary with ambient temperature. In particular, ambient temperature at which magnetic disk units are used is assumed to be in the range from −5 to 60° C., for example. Accordingly, the range of variation in light output of a light source contained in the head needs to be estimated to be considerably large. Furthermore, since the range of variation in temperature of the light source due to heat generated by surrounding elements and the light source itself is also considerably large, the range of variation in light output of the light source further increases. Therefore, in order to allow the light source to stably output a light with a constant intensity at varying ambient temperatures, variations in light output of the light source needs to be detected in real time to maintain a constant light output of the light source. However, little has been done to improve monitoring of the light output from the light source for thermal-assist.

When an edge-emitting laser diode is used as the light source, laser light emitted from the end surface on the opposite side to the end surface from which a light for thermal-assist is emitted can be used as a monitoring light to monitor the light output of the light source. For example, U.S. Pat. No. 4,860,276 discloses a technique in which a monitoring light emitted from an edge-emitting laser diode in an optical recording head is received by an edge-receiving photodiode to monitor the light output. However, it is extremely difficult to provide the combination of the light source and the photodiode on the element-integration surface of a head for thermal-assist together with the optical system of the head, because of the limited area of the element-integration surface. In fact, the area of the element-integration surface of a Femto slider commonly used as a head slider today is as small as 230 μm (micrometers)×700 μm. It may be contemplated to integrate the light source and the photodiode into one chip and then to mount the chip on the element-integration surface. However, this is not preferable because fabricating into one chip adds a great deal of cost. It is also very difficult to ensure a sufficient intensity of monitoring light emitted from the opposite edge of an edge-emitting laser diode without significantly reducing the intensity of output light for thermal-assist emitted from the light source.

SUMMARY OF THE INVENTION

Some terms used in the specification will be defined before explaining the present invention. In a layered structure or an element structure formed in the element-integration surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z side corresponds to a trailing side and −Z side to a leading side. And Y-axis direction indicates a track width direction, and X-axis direction indicates a height direction.

Further, a "side surface" of a waveguide provided within the magnetic recording head is defined as an end surface other than the end surfaces perpendicular to the direction in which light propagates within the waveguide (−X direction), out of all the end surfaces surrounding the waveguide. According to the definition, an "upper surface" and a "lower surface" are one of the "side surfaces". The "side surface" is a surface on which the propagating light can be totally reflected within the waveguide corresponding to a core.

According to the present invention, a thermally-assisted magnetic recording head is provided, which comprises:
a light source;
a write head element provided in an element-integration surface of a substrate and configured to generate a write field;
an optical system provided in the element-integration surface and configured to guide a light emitted from the light source to a vicinity of an end of the write head element, the end reaching an opposed-to-medium surface of the head; and
a light detector for monitoring an output of the light source, provided in the element-integration surface and comprising a light-receiving surface covering an area directly above at least a portion of the optical system.

In this thermally-assisted magnetic recording head, the light detector is provided in the element-integration surface, and the light-receiving surface of the light detector covers the area directly above at least a portion of the optical system that is also disposed in the element-integration surface. Therefore, this light detector can detect a leakage light emitted from the optical system as a monitoring light. As a result, there can be realized a feedback adjustment of light output from the light source for thermal-assist. Further, by using the feedback method, the light output can be adjusted according to variations in light output of the light source caused by environmental influences and variations over time in the light output, to stabilize the intensity of light for thermal-assist applied to a magnetic recording medium. Thereby a region on the magnetic recording medium in which data is to be written can be appropriately and stably heated.

In the thermally-assisted magnetic recording head according to the present invention, it is preferable that the optical system includes a spot-size converter configured to change a spot size of propagating light, and the light-receiving surface covers an area directly above at least a portion of the spot-size converter. In this preferable case, the spot-size converter is further preferably adjusted so as to emit a predetermined amount of leakage light. Further, it is also preferable that the optical system includes a waveguide, at least a portion of which curves and extends in such a manner that a light entering the waveguide changes traveling direction to reach an end portion of the waveguide on the opposed-to-medium surface side, and the light-receiving surface covers an area directly above at least a portion of the waveguide. In this preferable case, the waveguide is further preferably adjusted so as to emit a predetermined amount of leakage light. Furthermore, it is also preferable that the optical system includes a diffraction optical element and/or a light-path changer, and the light-receiving surface covers an area directly above at least a portion of the diffraction optical element and/or the light-path changer.

Further, in the thermally-assisted magnetic recording head according to the present invention, the light source is preferably an edge-emitting laser diode provided on the element-integration surface. Alternatively, a light source unit can be used instead of providing the light source directly on the slider. That is, it is also preferable that the thermally-assisted magnetic recording head comprises: a slider including the write head element, the optical system and the light detector; and a light source unit joined to the slider and including the light source. Further, as another embodiment, it is also preferable that the light source is a surface-emitting laser diode provided in the element-integration surface so as for its emitting surface to be opposed to the element-integration surface. This surface-emitting laser diode may be a semiconductor laser, such as a vertical-cavity surface-emitting laser (VCSEL) or a photonic-crystal type surface-emitting laser diode.

Further, in the thermally-assisted magnetic recording head according to the present invention, the center of gravity of a system consisting of the light source and the light detector is preferably on the center line of the element-integration surface in a track width direction. Setting the center of gravity as described above can more stabilize the attitude of the flying head, thereby contributing to reliable write and read operations.

Furthermore, in the head according to the present invention, it is preferable that the optical system comprises a near-field optical device configured to receive a light propagating through the optical system and to emit a near-field light from an end that reaches the opposed-to-medium surface. In this case, the near-field optical device preferably is a surface plasmon generator comprising an edge extending to an end that reaches the opposed-to-medium surface, the edge propagating a surface plasmon excited by the light propagating through the optical system.

According to the present invention, a head gimbal assembly (HGA) is further provided, which comprises a thermally-assisted magnetic recording head as described above and a suspension that supports the thermally-assisted magnetic recording head.

According to the present invention, a magnetic recording apparatus is further provided, which comprises: at least one HGA as described above; at least one magnetic recording medium; and a recording and light-emission control circuit configured to control light-emission operations of the light source by using a monitor output from the light detector, and to control write operations that the thermally-assisted magnetic recording head performs to the at least one magnetic recording medium.

According to the present invention, a method for controlling light-emission operations of the light source in the thermally-assisted magnetic recording head is further provided, which comprises the steps of:
determining a relationship between an intensity of a light emitted from the light source and a monitoring output from the light detector in advance; and
controlling an intensity of the light emitted from the light source, based on an actually-measured monitor output of the light detector, with use of the determined relationship.

In this method for controlling light-emission operations, it is preferable that the light source is an edge-emitting laser diode, and to determine the relationship, there is measured a relationship between an intensity of a light emitted from an end surface of the laser diode on the side opposite to an end surface from which the monitored light is emitted and a monitoring output of the light detector.

According to the present invention, a method for screening the thermally-assisted magnetic recording heads as described above is further provided, which comprises the steps of:

determining a relationship between an intensity of a light emitted from the light source and a monitoring output from the light detector in advance;

measuring an intensity of the output light emitted from the light source; then calculating a light use efficiency of the optical system in a head, based on a monitoring output of the light detector measured at the time of measuring the intensity of the emitted output light; and determining the head to be acceptable if the calculated light use efficiency is higher than or equal to a predetermined reference value.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIGS. 3a and 3b show a plan view and a cross-sectional view, respectively, schematically illustrating the configuration of a laser diode, a photodiode, an optical system for generating near-field light, and a magnetic head element which are provided in the element-integration surface;

FIGS. 10a and 10b show schematic views illustrating alternatives in thermal-assist of the thermally-assisted magnetic recording head according to the present invention;

FIG. 12 shows a block diagram illustrating the circuit structure of the recording/reproducing and light-emission control circuit of the magnetic disk apparatus shown in FIG. 1.

DESCRIPTION OF THE PREFERRED EMBODIMENTS

Figure 1:
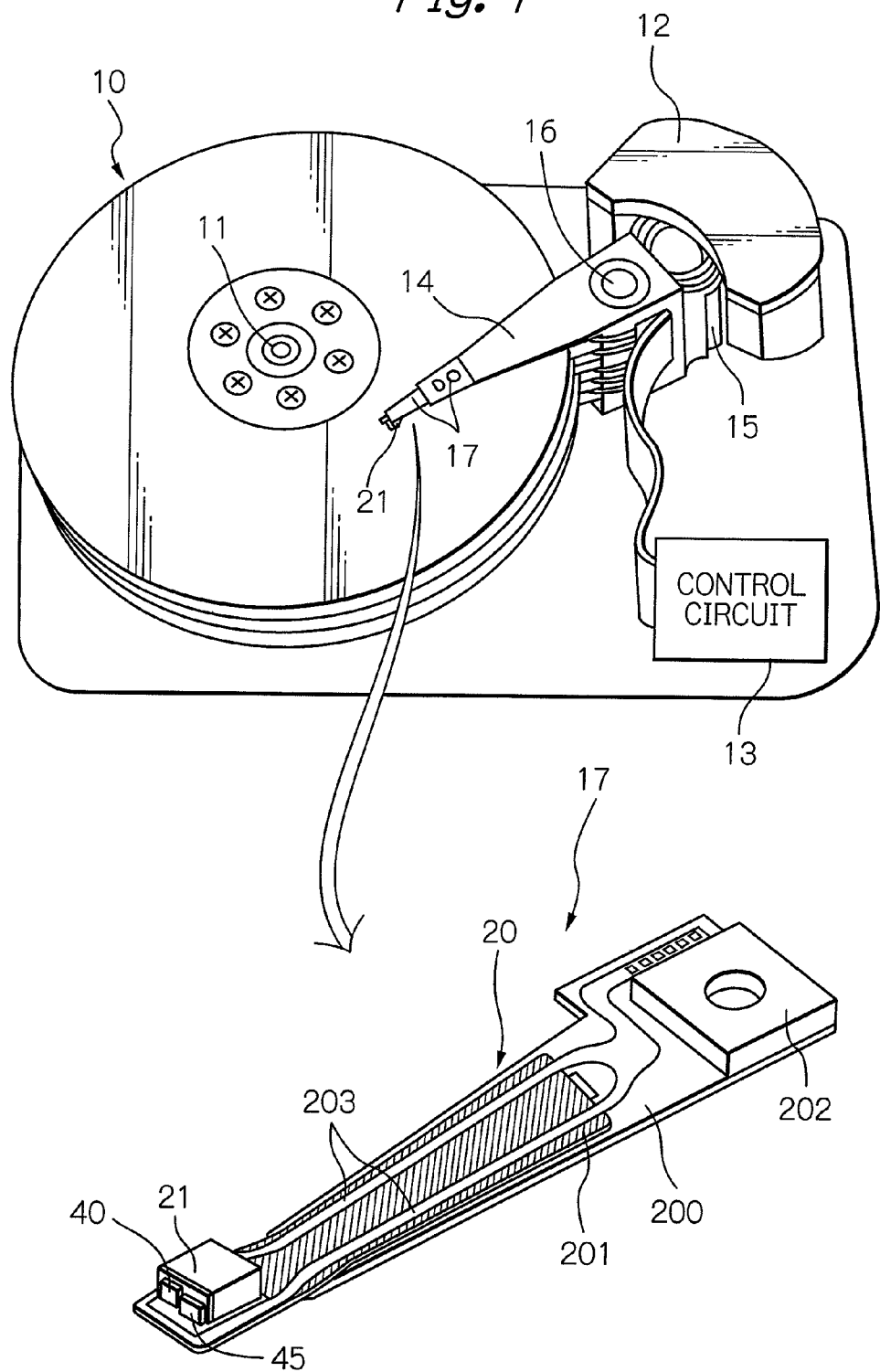
FIG. 1 shows a perspective view schematically illustrating a structure of a major part in one embodiment of a magnetic recording apparatus and a head gimbal assembly (HGA) according to the present invention.

FIG. 1 shows a perspective view schematically illustrating a structure of a major part in one embodiment of a magnetic recording apparatus and a head gimbal assembly (HGA) according to the present invention. Here, in the perspective view of the HGA, the side of the HGA, opposed to the surface of a magnetic recording medium, is presented as the upper side.

A magnetic disk apparatus as a magnetic recording apparatus shown in FIG. 1 includes: a plurality of magnetic disks 10 as magnetic recording media, rotating around a rotational axis of a spindle motor 11; an assembly carriage device 12 provided with a plurality of drive arms 14 thereon; a head gimbal assembly (HGA) 17 attached on the top end portion of each drive arm 14 and provided with a thermally-assisted magnetic recording head 21 as a thin-film magnetic head; and a recording/reproducing and light-emission control circuit 13.

The thermally-assisted magnetic recording head 21 includes: a laser diode 40 as a light source for emitting laser light used for thermally-assisted magnetic recording; and a photodiode 45 as a light detector for conducting a feedback adjustment of the light output of the laser diode 40. Both of the laser diode 40 and photodiode 45 are provided in the element-integration surface of a slider substrate that is a base of the thermally-assisted magnetic recording head 21. The laser diode 40 is, in the present embodiment, of edge-emitting type, and the photodiode 45 is a diode in which the mounting surface (bottom surface) is a light-receiving face. Further, the recording/reproducing and light-emission control circuit 13 is provided for controlling write/read operations of the thermally-assisted magnetic recording head 21 and further for controlling the emission operation of the laser diode 40 based on the monitoring output generated from the photodiode 45.

In the present embodiment, the magnetic disk 10 is designed for perpendicular magnetic recording, and has a structure in which sequentially stacked on a disk substrate is: a soft-magnetic under layer; an intermediate layer; and a magnetic recording layer (perpendicular magnetization layer). The anisotropic magnetic field (coercive force) of the magnetic recording layer is set to be a sufficiently large value for stabilizing the magnetization in room temperature. The assembly carriage device 12 is a device for positioning the thermally-assisted magnetic recording head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and thermally-assisted magnetic recording heads 21 may be one.

Referring also to FIG. 1, a suspension 20 in the HGA 17 includes: a load beam 200; a flexure 201 with elasticity fixed to the load beam 200; and a base plate 202 provided on the base portion of the load beam 200. Further, on the flexure 201, there is provided a wiring member 203 that is made up of lead conductors and connection pads electrically joined to both ends of the lead conductors. The thermally-assisted magnetic recording head 21 is fixed to the flexure 201, that is, to the top end portion of the suspension 20 so as to face the surface of each magnetic disk 10 with a predetermined spacing (flying height). Moreover, one ends of the wiring member 203 are electrically connected to terminal electrodes of the thermally-assisted magnetic recording head 21. The structure of the suspension 20 is not limited to the above-described one. An IC chip for driving the head may be mounted midway on the suspension 20, though not shown.

Figure 2:
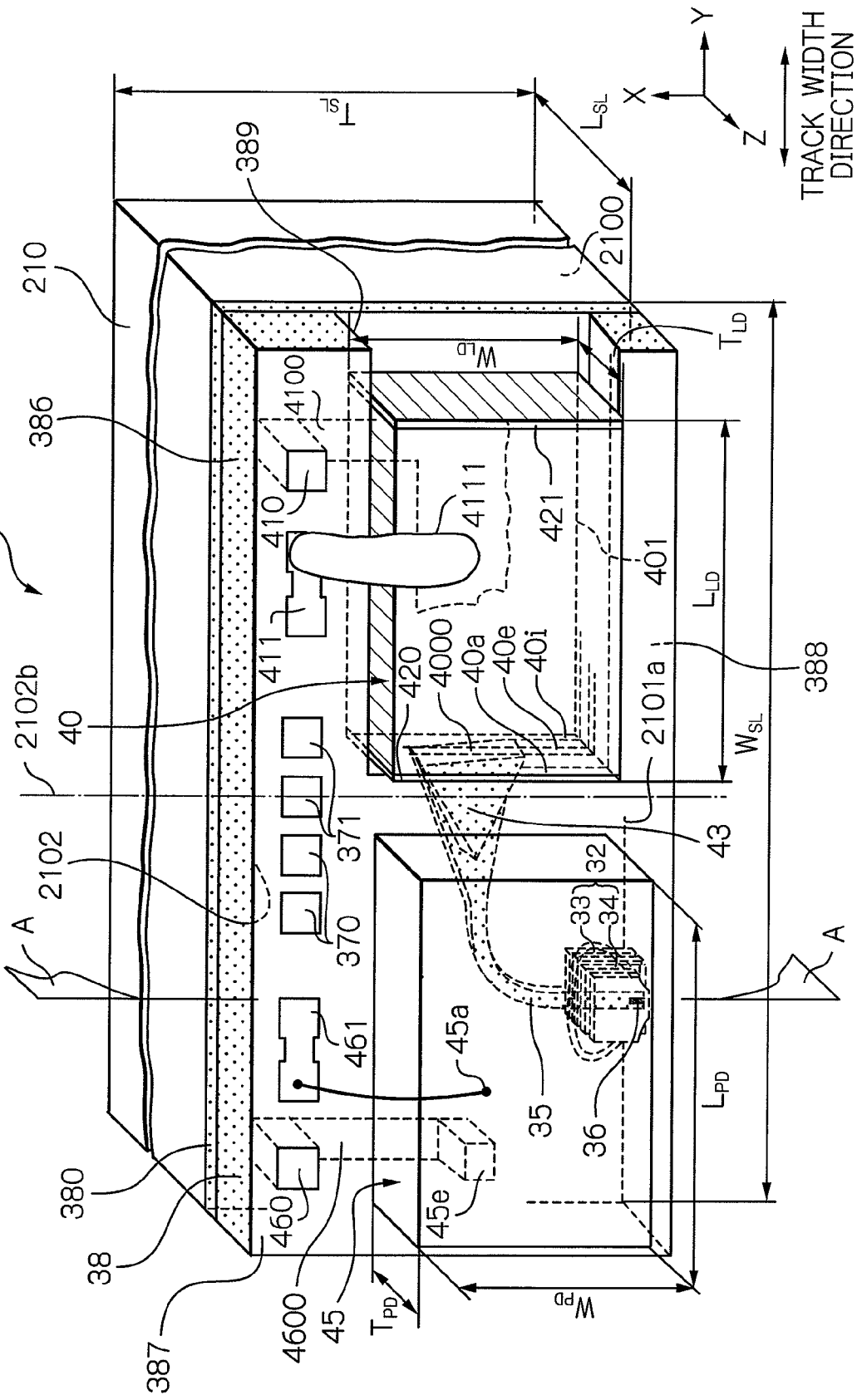
FIG. 2 shows a perspective view illustrating one embodiment of a thermally-assisted magnetic recording head according to the present invention.

FIG. 2 shows a perspective view illustrating one embodiment of thermally-assisted magnetic recording head 21 according to the present invention.

As shown in FIG. 2, a thermally-assisted magnetic recording head 21 includes: a slider substrate 210 formed of, for example, AlTiC ($Al_2O_3$—TiC), and having an air bearing surface (ABS) 2100 as an opposed-to-medium surface processed so as to provide an appropriate flying height; a head element 32, a spot-size converter 43, a waveguide 35 and a surface plasmon generator 36, which are formed in an element-integration surface 2102 of the slider substrate 210, the surface 2102 being perpendicular to the ABS 2100; an overcoat layer 38 formed on the element-integration surface 2102, so as to cover these elements; a laser diode 40 disposed in the element-integration surface 2102; and a photodiode 45 provided also in the element-integration surface 2102 and on the upper surface 387 of the overcoat layer 38. Here, the head end surface 388, which is a surface of the overcoat layer 38 opposed to the medium, and the ABS 2100 constitute the whole opposed-to-medium surface of the thermally-assisted magnetic recording head 21.

The head element 32 is constituted of a magnetoresistive (MR) element 33 for reading data from the magnetic disk and an electromagnetic transducer 34 for writing data to the magnetic disk. The spot-size converter 43 is an optical element that receives a laser light emitted from the laser diode 40, changes (reduces) the spot size of the laser light, then guides the laser light into the waveguide 35. Further, the waveguide 35 is an optical path for guiding the laser light with changed spot size to the head end surface 388 or its vicinity. The surface plasmon generator 36 is a near-field optical device that converts the laser light (waveguide light) propagating through the waveguide 35 into near-field light. Here, the spot-size converter 43, the waveguide 35, and the surface plasmon generator 36 constitute an optical system for generating near-field light within the head 21.

Furthermore, the thermally-assisted magnetic recording head 21 includes: a pair of terminal electrodes 370 exposed in the upper surface 387 of the overcoat layer 38 and electrically connected to the MR element 33; a pair of terminal electrodes 371 also exposed in the upper surface 387 of the overcoat layer 38 and electrically connected to the electromagnetic transducer 34; a pair of terminal electrodes 410 and 411 also exposed in the upper surface 387 of the overcoat layer 38 and electrically connected to the laser diode 40; and a pair of terminal electrodes 460 and 461 also exposed in the upper surface 387 of the overcoat layer 38 and electrically connected to the photodiode 45. These terminal electrodes 370, 371, 410, 411, 460 and 461 are electrically connected to the connection pads of the wiring member 203 provided on the flexure 201 (FIG. 1).

One ends of the MR element 33, the electromagnetic transducer 34, and the surface plasmon generator 36 reach the head end surface 388 as an opposed-to-medium surface. During actual write and read operations, the thermally-assisted magnetic recording head 21 aerodynamically flies above the surface of the rotating magnetic disk 10 (FIG. 1) with a predetermined flying height. Thus, the ends of the MR element 33 and electromagnetic transducer 34 face the surface of the magnetic recording layer of the magnetic disk with an appropriate magnetic spacing. Then, the MR element 33 reads data by sensing signal magnetic field from the magnetic recording layer, and the electromagnetic transducer 34 writes data by applying signal magnetic field to the magnetic recording layer. When writing data, laser light is emitted from the laser diode 40 disposed in the element-integration surface 2102 of the head 21 and propagates through the spot-size converter 43 and the waveguide 35. Then, the laser light is coupled with the surface plasmon generator 36 in a surface plasmon mode as described in detail later. As a result, surface plasmon is excited on the surface plasmon generator 36. The surface plasmon propagates on a propagation edge 360 (FIG. 8), which will be explained later, provided in the surface plasmon generator 36 toward the head end surface 388, which causes near-field light to be generated from the end on the head end surface 388 side of the surface plasmon generator 36. The generated near-field light reaches the surface of the magnetic disk 10, and heats a portion of the magnetic recording layer of the disk 10. As a result, the anisotropic magnetic field (coercive force) of the portion is decreased to a value that enables writing; thus the thermally-assisted magnetic recording can be accomplished.

Also according to FIG. 2, the slider substrate 210 is, for example, so-called a femto slider in which the thickness $T_{SL}$ (in X-axis direction) is 230 μm (micrometers), the width $W_{SL}$ in the track width direction (Y-axis direction) is 700 μm, and the length $L_{SL}$ (in Z-axis direction) is 850 μm. The femto slider is generally used as a substrate for thin-film magnetic heads capable of high-density recording, and has the smallest standardized size of all the sliders currently on the market. In this case, the element-integration surface 2102 of the slider substrate 210 is a region with the area of 230 μm ($T_{SL}$)×700 μm ($W_{SL}$).

Both of the laser diode 40 and photodiode 45 are mounted in the element-integration surface 2102 with such a small area. The laser diode 40 is, in the present embodiment, of edge-emitting type. As the laser diode 40, InP base, GaAs base or GaN base diodes can be utilized, which are usually used for communication, optical disk storage, or material analysis. The wavelength $\lambda_L$ of the emitted laser light may be, for example, in the range of approximately 375 nm (nanometers) to 1.7 μm. For example, a laser diode of InGaAsP/InP quaternary mixed crystal can be used, in which possible wavelength region is set to be from 1.2 to 1.67 μm. The laser diode 40 has a multilayered structure including an n-electrode 40a, an active layer 40e, and a p-electrode 40i. On the front and rear cleaved surfaces of the multilayered structure, respectively formed are reflective layers 420 and 421 for exciting the oscillation by total reflection. Further, on the reflective layer 420, there is provided an opening in the position of the active layer 40e including a light-emission center 4000. There may be also provided an opening in the position of the active layer 40e on the reflective layer 421. As explained with reference to FIG. 12 later, by measuring the intensity of a laser light emitted from the opening, there can be estimated the intensity of a laser light for thermal-assist emitted from the opening on the opposite side.

Further, in the present embodiment, the laser diode 40 is fixed to the slider substrate 210 in such a way that the p-electrode 40i becomes on the side of a base layer 380 formed on the element-integration surface 2102; that is, the p-electrode 40i becomes the bottom. The laser diode 40 is located in the concave portion 389 where the overcoat layer 38 does not exist, and the p-electrode 40i is electrically joined to a lead electrode 4100 of the terminal electrode 410, the lead electrode 4100 being formed on the base layer 380. Further, the laser diode 40 is disposed in such a way that an edge 401 in the longitudinal direction within the bottom of the laser diode 40 is parallel with an edge 2102*a* on the head end surface 388 side of the element-integration surface 2102. This installation of the laser diode 40 corresponds to "horizontal mounting" in which the edge 401 of the laser diode 40 in the longitudinal direction is directed along the track width direction (Y-axis direction).

The concave portion 389 can be formed by performing a wet etching of a portion of the overcoat layer 38 with a predetermined etching mask and a predetermined etchant. In the case that, for example, the lead electrode 4100 is formed of Au and the etching mask is formed of NiFe, ferric chloride ($FeCl_3$) solution can be used as the etchant.

An output power of the laser diode 40 required for attaining a recording density exceeding 1 Tbits/in$^2$, for example, is estimated to have a sufficiently large value of 50 mW or more. This requires a sufficiently large cavity length. The cavity length is a distance between the reflective layers 420 and 421, and is approximately equivalent to the length $L_{LD}$ of the laser diode 40. Thus, the length $L_{LD}$ is preferably, for example, 300 µm or more to provide a sufficiently high output. The above-described "horizontal mounting" enables the laser diode 40 with such a high output to be set without protruding beyond the element-integration surface 2102. The width $W_{LD}$ of the laser diode 40 is, for example, in the range from 120 to 200 µm. The height $T_{LD}$ of the laser diode 40 is, for example, in the range approximately from 60 to 200 µm. Alternatively, the laser diode 40 may be disposed in such a way that the edge 401 is inclined at a predetermined acute angle from the edge 2102*a* within the element-integration surface 2102. Also in this case, the laser diode 40 is preferably disposed without protruding beyond the element-integration surface 2102. The setting of the laser diode 40 without protruding beyond the element-integration surface 2102 allows the slider substrate 210 to function as a heatsink that receives heat from the entire bottom surface of the laser diode 40 and effectively suppresses excessive temperature rise of the laser diode 40.

As shown also in FIG. 2, the photodiode 45 is a diode in which a light-receiving surface 450 is the mounting surface (bottom surface) of the photodiode 45. The light-receiving surface 450 covers a area directly above (on +Z side of) at least a portion of spot-size converter 43 of the optical system within the head 21 and a area directly above at least a portion of waveguide 35 of the optical system. Here, the spot-size converter 43 is adjusted so as to leak a predetermined amount of leakage light, as explained later with reference to FIGS. 4*a* and 4*b*. Further, at least a portion of the waveguide 35 curves and extends in such a manner that incident light from the spot-size converter 43 changes the traveling direction to reach the head end surface 388 or its vicinity. The curvature of the waveguide 35 is adjusted so that the waveguide 35 leaks a predetermined amount of leakage light. Accordingly, the photodiode 45 can receive the leakage light that leaks from the spot-size converter 43 and the waveguide 35 at its light-receiving surface 450 as monitoring light. By using the monitoring output from the photodiode 45, feedback adjustment of the light output of the laser diode 40 as a light source for thermal-assist can be implemented. Since the light output can be adjusted in this way according to variations in light output of the laser diode 40 caused by environmental influences and variations over time in the light output to stabilize the intensity of near-field light for thermal-assist applied to a magnetic disk 10, a region on the magnetic disk 10 in which data is to be written can be appropriately and stably heated.

The length $L_{PD}$ (in Y-axis direction) of the photodiode 45 is approximately in the range from 200 to 500 µm, for example. The width $W_{PD}$ (in X-axis direction) of the photodiode 45 is approximately 120 to 200 µm, for example. The height $T_{PD}$ (in Z-axis direction) of the photodiode 45 is approximately 60 to 200 µm, for example. Here, the light-receiving surface 450 is a region in the area of length $L_{PD}\times$width $W_{PD}$.

Because the photodiode 45, in the present invention, is disposed directly above the optical system such as the spot-size converter 43 and the waveguides 35, the photodiode 45 can be disposed alongside the laser diode 40 on the element-integration surface 2102 instead of overlapping the laser diode 40. The photodiode 45 can be fixed on the upper surface 387 of an overcoat layer 38 by using a UV (ultraviolet) cure adhesive, for example. Since the photodiode 45 receives leakage light at its entire light-receiving surface 450, the alignment accuracy of mounting of the photodiode 45 does not need to be as high as the position accuracy of the optical system including the waveguide 35 and the surface plasmon generator 36. The laser diode 40 can be fixed in the concave portion 389 by evaporating a film of Au—Sn alloy, for example, on the lead electrode 4100, placing the laser diode 40 on the evaporated film, and then heating them with a hotplate or the like under a hot-air blower to approximately 200 to 300° C.

The laser diode 40 and the photodiode 45 are preferably mounted in such a way that the center of gravity of the system consisting of the laser diode 40 and the photodiode 45 disposed in the element-integration surface 2102 is on the center line 2102*b* of the element-integration surface 2102 in the track width direction (Y-axis direction). A thermally-assisted magnetic recording head 21 flies over the magnetic disk 10 during writing and reading. Setting the center of gravity as described above can more stabilize the attitude of the flying head 21, thereby contributing to reliable write and read operations.

Referring also to FIG. 2, a terminal electrode 410 is electrically connected to the p-electrode 40*i*, which is the bottom surface of the laser diode 40, with a lead electrode 4100. Further, a terminal electrode 411 is electrically connected to the n-electrode 40*a*, which is the upper surface of the laser diode 40. Here, the terminal electrode 411 and the n-electrode 40*a* may be connected to each other with solder 4111 formed by a solder-ball bonding (SBB) method or with a wire used for a wire-bonding method. There may be used as the solder 4111 a metal including, for example, Sn, Pb, Ag, Cu, Zn, Al, Bi, In or the like. These terminal electrodes 410 and 411 are electrically connected to connection pads of the wiring member 203 provided on the flexure 201 (FIG. 1). When a predetermined voltage is applied to the laser diode 40 through both electrodes 410 and 411, laser light is emitted from the light-emission center 4000 of the laser diode 40. Here, in the head structure shown in FIG. 2, it is preferable that the oscillation direction of electric field of the laser light emitted from the laser diode 40 is perpendicular to a layer surface of the active layer 40*e* (in Z-axis direction). That is, the laser light emitted from the laser diode 40 preferably has TM-mode polarization. This enables the waveguide light propagating through the waveguide 35 to be coupled with the surface plasmon generator 36 in a surface plasmon mode, as described later.

Furthermore, the terminal electrode 460 is electrically connected to a p-electrode 45*e* provided on the bottom surface (light-receiving surface 450) of the photodiode 45 with a lead electrode 4600. The terminal electrode 461 is electrically connected to a n-electrode 45*a* as the upper surface of the photodiode 45. The terminal electrode 461 and the n-electrode 40*a* can be connected to each other with a wire-bonding method or an SBB method. These terminal electrodes 460 and 461 are electrically connected to connection pads of the wiring member 203 provided on the flexure 201 (FIG. 1). Monitoring output depending on the amount of leakage light that the light-receiving surface 450 receives can be taken out from the photodiode 45 through both electrodes 460 and 461.

Further, an electric source provided within the magnetic disk apparatus can be used for driving the laser diode 40. In fact, the magnetic disk apparatus usually has an electric source with applying voltage of, for example, approximately 2 to 5 V, which is sufficient for the laser oscillation. The laser diode 40 preferably has a laser output power of at least 50 mW as described above; even in the case that the amount of electric power consumption of the laser diode 40 is, for example, in the vicinity of one hundred mW, the amount can be covered sufficiently by the electric source provided within the magnetic disk apparatus. Here, the laser diode 40, the photodiode 45, the terminal electrodes 410 and 411, and the terminal electrodes 460 and 461 are not limited to the above-described embodiment. For example, the laser diode 40 may be fixed in the slider substrate 210 in such a manner that the n-electrode 40a is positioned at the bottom. Further, other light detectors such as various types of photodiodes or photo-resistors having a light-receiving surface with a predetermined area can be used as a light detector that detects leakage light as a monitoring light. Further, the terminal electrodes 410 and 411, and 460 and 461 can be provided on the head end surface 386 on the side opposite to the head end surface 388 as an opposed-to-medium surface.

FIGS. 3a and 3b show a plan view and a cross-sectional view, respectively, schematically illustrating a configuration of the laser diode 40, the photodiode 45, the optical system for generating near-field light, and the magnetic head element 32 which are provided in the element-integration surface 2102. For clarity, the photodiode 45 and the magnetic head element 32 are depicted with dashed-lines in FIG. 3a.

Referring to FIGS. 3a and 3b, the spot-size converter 43 is an optical element that receives laser light emitted from the laser diode 40, converts (reduces) the spot size of the laser light, and then guides the laser light to the light-receiving end surface 352 of the waveguide 35. The propagation efficiency of the spot-size converter 43 is adjusted so as to leak a predetermined amount of leakage light 47 (FIG. 3b) as will be described later with respect to FIGS. 4a and 4b. The light-receiving end surface 430 of the spot-size converter 43 may be preferably inclined at a predetermined acute angle $\theta_{430}$ with respect to the end surface 400 including the light-emission center 4000 of the laser diode 40. The angle $\theta_{430}$ is approximately 4° (degrees), for example. Such angle prevents a laser light reflected by the light-receiving end surface 430 from returning to the light-emission center 4000.

The waveguide 35 extends from the light-receiving end surface 352 that receives laser light from the spot-size converter 43 to the end surface 350 on the head end surface 388 side. At least a portion of the waveguide 35 is curved in XY-plane. Accordingly, laser light entering through the light-receiving end surface 352 and traveling through the waveguide 35 (waveguide light) is redirected and reaches a portion opposed to the surface plasmon generator 36. While traveling through the waveguide 35, the waveguide light is reflected by the side surfaces of the waveguide 35 including the curved portions to change its direction. The curvature (the distribution of curvature radius) of the waveguide 35, in particular the degree of reflection of waveguide light by the curved portions of the side surfaces of the waveguide 35, is appropriately adjusted. Specifically, the curvature is adjusted so that a predetermined amount of leakage light 48 (FIG. 3b) is emitted from the waveguide 35. For example, it has been found that the propagation efficiency of laser light propagating through a waveguide that has a cross-section of 0.5 μm×0.4 μm and is formed of $TaO_x$, surrounded by an overcoat layer of $Al_2O_3$ that functions as a clad, is 49.2%, when the waveguide is curved with a curvature radius $r_c$ of 2 μm at an angle of 90° (degrees). In this case, nearly half the amount of light can be leaked from the waveguide to the outside.

Referring to FIG. 3b, the light-receiving surface 450 of the photodiode 45 covers the area directly above (on +Z side of) the most portion (the portion narrowed in X-axis direction) of the spot-size converter 43 and the area directly above the curved portion of the waveguide 35. Consequently, the photodiode 45 can receive, at its light-receiving surface 450, leakage lights 47 and 48 leaking from the spot-size converter 43 and the waveguide 35 as monitoring light. Depending on the position and configuration of the optical system, the leakage lights 47 and 48 may include a leakage light component 49 that is leaked from the spot-size converter 43 and the waveguide 35 and is reflected by the element-integration surface 2102 toward the light-receiving surface 450. The distance between the photodiode 45 and the optical system such as the spot-size converter 43 and waveguide 35 that leak light is set to be in the range of approximately 5 to 50 μm, for example.

The photodiode 45 is a diode with a PN junction between p-type silicon and n-type silicon, for example. In the present embodiment, the photodiode 45 includes, from the light-receiving surface (bottom surface) 450 side, an insulating layer 45d, a p-electrode 45e passing completely through the insulating layer 45d, a p-type semiconductor layer 45c electrically coupled to the p-electrode 45e, an n-type semiconductor layer 45b forming the PN junction with the p-type semiconductor layer 45c, and an n-electrode 45a electrically coupled to the n-type semiconductor layer 45b. When leakage light 47 and 48 hits the PN junction between the n-type semiconductor layer 45b and the p-type semiconductor layer 45c, a number of pairs of electron and hole according to the amount of the leakage light are generated and the electrons flow into the n-type semiconductor layer 45b and the holes flow into the p-type semiconductor layer 45c. As a result, photovoltaic power according to the amount of leakage light 47 and 48 is generated between the n-electrode 45a and the p-electrode 45e. Monitoring output of the photodiode 45 can be obtained by measuring the photovoltaic power or by measuring the current flowing across a load connected between the n-electrode 45a and the p-electrode 45e.

Figure 4A:
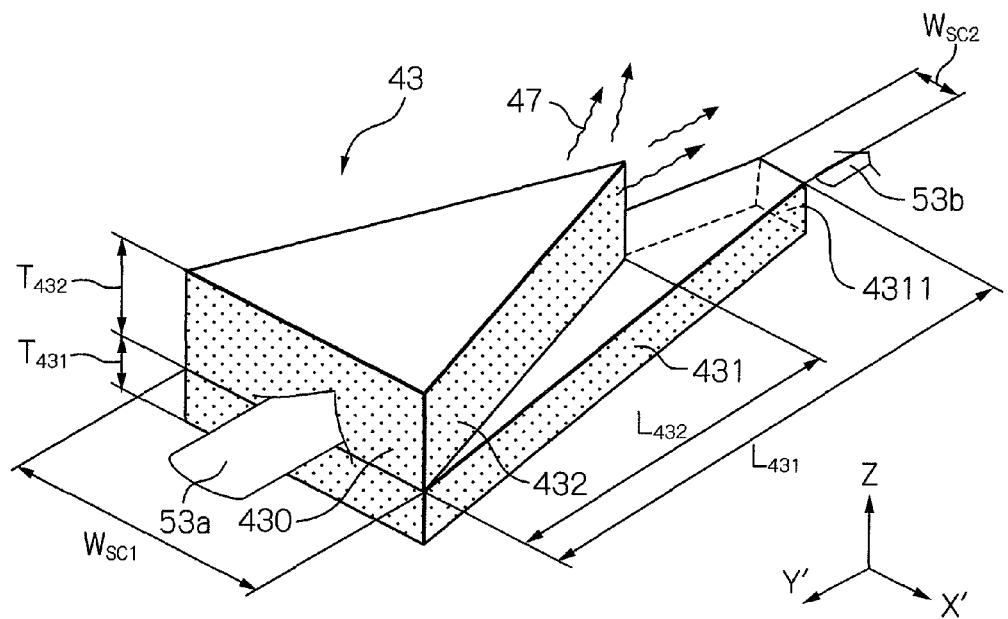
FIG. 4a shows a perspective view schematically illustrating one embodiment of a spot-size converter.
Figure 4B:
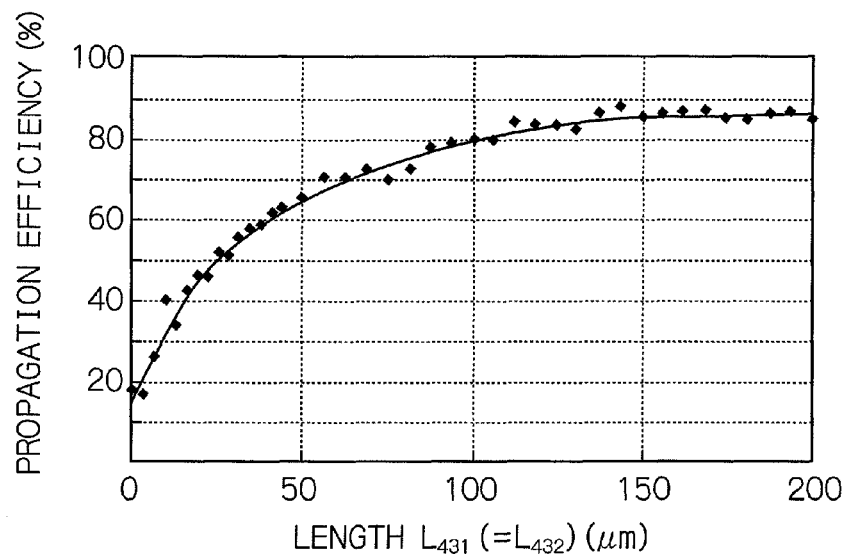
FIG. 4b shows a graph of the length $L_{432}$ of the spot-size converter depicted in FIG. 4a versus the propagation efficiency of the spot-size converter determined by a simulation experiment.

FIG. 4a shows a perspective view schematically illustrating one embodiment of the spot-size converter 43. FIG. 4b shows a graph of the length $L_{432}$ of the spot-size converter 43 depicted in FIG. 4a versus the propagation efficiency of the spot-size converter 43 determined by a simulation experiment.

As illustrated in FIG. 4a, the spot-size converter 43 includes: a lower propagation layer 431 having a width in X'-axis direction that gradually decreases from the width $W_{SC1}$ substantially along the traveling direction of laser light 53a incident through the light-receiving end surface 430; and an upper propagation layer 432 that is stacked on the lower propagation layer 431 and has a width in the X'-axis direction that more steeply decreases from the width $W_{SC1}$ substantially along the traveling direction of the laser light 53a than the width of the lower propagation layer 431. As laser light 53a incident through the light-receiving end surface 430 propagates through the layered structure, the spot size of the laser light 53a gradually decreases. The laser light 53a goes out through the light-emitting end surface 4311 as laser light 53b.

The spot-size converter 43 is formed of a material that has a refractive index higher than the refractive index $n_{OC}$ of the constituent material of the surrounding overcoat layer 38. Thus, the spot-size converter 43 can be formed from the same dielectric material as the waveguide 35, which will be described later. Therefore, the spot-size converter 43 and the waveguide 35 may be formed integrally. The width $W_{SC1}$ of the wider end of the spot-size converter 43 along X'-axis direction may be approximately 1 to 5 µm, for example. The width $W_{SC2}$ of the other end along X'-axis direction may be approximately 0.2 to 1 µm, for example. The thickness (in Z-axis direction) $T_{431}+T_{432}$ may be approximately 1 to 10 µm, for example. The length $L_{431}$ in Y'-axis direction may be approximately 30 to 300 µm, for example.

The spot-size converter 43 converts a laser light with a large spot diameter to a laser light with a smaller spot diameter and allows the laser light to enter the waveguide 35 while maintaining a single mode. For example, experiments have shown that if in reality the thickness $T_{431}+T_{432}$ of the spot-size converter 43 is 5 µm and the thickness $T_{WG}$ of the waveguide 35 is 0.5 µm, the spot-size converter 43 reduces the spot diameter of laser light 53a by a factor of at least 10 to adequately reduce loss of the laser light 53a during propagation from the spot-size converter 43 to the waveguide 35, and further the laser light can avoid propagating in multimode.

In order to determine the propagation efficiency of the spot-size converter 43, a simulation experiment has been conducted. The simulation experiment was implemented by using three-dimensional Finite-Difference Time-Domain (FDTD) method, which is an electromagnetic field analysis. In the simulation experiment, the wavelength $\lambda_L$ of incident laser light 53a was 800 nm, and the lower and upper propagation layers 431 and 432 formed of $TaO_x$ (tantalum oxide with a refractive index n=2.15) were used. The overcoat layer 38 (FIG. 2), which is a clad surrounding the spot-size converter 43, was formed of $Al_2O_3$ (alumina with a refractive index n=1.65). The width $W_{SC1}$ in X'-axis direction of the spot-size converter 43 at the light-receiving end surface 430 was 4 µm. The thickness $T_{431}$ of the lower propagation layer 431 in Z-axis direction was 0.5 µm, and the width $W_{SC2}$ of the light-emitting end surface 4311 in X'-axis direction was 0.5 µm. The thickness $T_{432}$ of the upper propagation layer 432 in Z-axis direction was 0.75 µm.

Under these experimental conditions, the length $L_{431}$ of the lower propagation layer 431 in Y'-axis direction and the length $L_{432}$ of the upper propagation layer 432 in Y'-axis direction were chosen to be equal to each other, and the propagation efficiency of the spot-size converter 43 was calculated through the simulation experiment with various values of the equal lengths $L_{431}$ and $L_{432}$ in the range up to 200 µm. The result is shown in FIG. 4b. The calculated propagation efficiency of the spot-size converter 43 was the intensity ratio $I_{OUT}/I_{IN}$, where $I_{IN}$ is the intensity of laser light 53a incident at the light-receiving end surface 430 and $I_{OUT}$ is the intensity of laser light 53b emitted from the light-emitting end surface 4311.

As shown in FIG. 4b, the propagation efficiency of the spot-size converter 43 increases as the length $L_{431}$ ($=L_{432}$) increases until the length $L_{431}$ ($=L_{432}$) reaches 150 µm, then the propagation efficiency becomes nearly constant (approximately 86%) in the $L_{431}$ ($=L_{432}$) range of 150 µm or more. Therefore, a spot-size converter 43 with a propagation efficiency of approximately 86% can be provided by choosing the length $L_{431}$ ($=L_{432}$) to be 150 µm, for example. The propagation loss in the spot-size converter 43 is caused mostly by steep reduction of the spot diameter of the propagating laser light. Thus, leakage light 47 corresponding to approximately 14% of the propagation loss is emitted from the spot-size converter 43. Further, the propagation efficiency of the spot-size converter 43 can be set to a desired value in the range from approximately 16% to approximately 86% by adjusting the length $L_{431}$ ($=L_{432}$) in the range up to 150 µm as can be seen from FIG. 4b. It will be understood therefore that the amount of leakage light 47 can be set to a value in a given range by adjusting the length $L_{431}$ ($=L_{432}$).

Using a spot-size converter 43 of a different size, the propagation efficiency could be set in a wider range to adjust the amount of leakage light. For example, a simulation experiment has shown that if the light output of the laser diode 40 is in the range of 10 to 60 mW, the propagation efficiency of the spot-size converter 43 can be adjusted to cause approximately 1 to 10% of the light output to be leaked toward the photodiode 45, so that the photodiode 45 can receive monitoring light of approximately 0.1 to 6 mW.

Thus, it is appreciated that the amount of leakage light 47 emitted from the spot-size converter 43 can be controlled by adjusting the length $L_{431}$ and $L_{432}$. Consequently, by using the spot-size converter 43 in which the amount of leakage light 47 is controlled to a desired value, the amount of laser light required for thermal-assist can be propagated from the spot-size converter 43 to the waveguide 35 and yet the amount of monitoring light required for monitoring by the photodiode 45 can be reliably provided.

Figure 5:
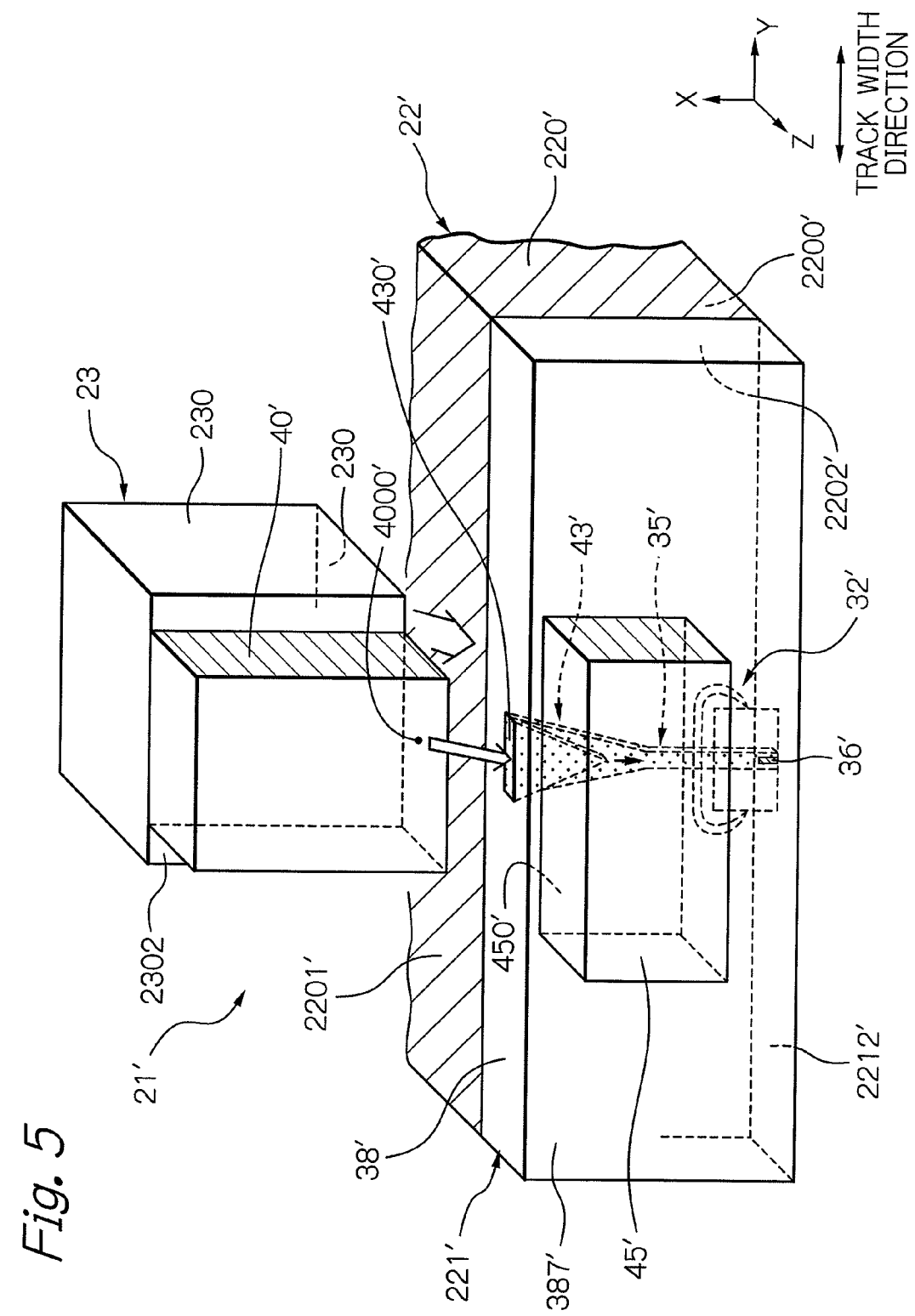
FIG. 5 shows a perspective view schematically illustrating another embodiment of the thermally-assisted magnetic recording head according to the present invention.

FIG. 5 shows a perspective view schematically illustrating another embodiment of the thermally-assisted magnetic recording head according to the present invention.

As shown in FIG. 5, a thermally-assisted magnetic recording head 21' is constituted of a slider 22' and a light source unit 23. The slider 22' includes: a slider substrate 220' formed of, for example, AlTiC ($Al_2O_3$—TiC), and having an ABS 2200'; and a head part 221' formed on an element-formation surface 2202' perpendicular to the ABS 2200'. While, the light source unit 23 includes: a unit substrate 230 formed of, for example, AlTiC ($Al_2O_3$—TiC), and having an joining surface 2300; and a laser diode 40' as a light source provided on a source-installation surface 2302 perpendicular to the joining surface 2300. The slider 22' and the light source unit 23 are bonded to each other in such a way that the back surface 2201' of the slider substrate 220' and the joining surface 2300 of the unit substrate 230 have a surface contact with each other. In the bonding, the locations of the unit substrate 230 and the slider substrate 220' are determined in such a way that the laser light generated from the light-emission center 4000' of the laser diode 40' can directly enter the light-receiving end surface 430' of a spot-size convertor 43' provided in the head part 221'.

The head part 221' formed on the slider substrate 220' includes: a head element 32' for reading data from the magnetic disk and for writing data to the magnetic disk; a spot-size convertor 43' that receives a laser light emitted from the laser diode 40', changes (reduces) the spot size of the laser light, then guides the laser light into the waveguide 35'; a waveguide 35' for guiding the laser light with the changed spot size to the head part end surface 2212' as an opposed-to-medium surface or to its vicinity; a surface plasmon generator 36'; and an overcoat layer 38 formed on the element-formation surface 2202' in such a way as to cover the head element 32', the spot-size convertor 43', the waveguide 35', and the surface plasmon generator 36'. Here, the spot-size convertor 43', the waveguide 35' and the surface plasmon generator 36' constitute an optical system for generating near-field light within the head 21'.

The photodiode 45' is a diode in which a light-receiving surface 450' is the mounting surface (bottom surface) of the photodiode 45', and is disposed on the upper surface 387' of the overcoat layer 38'. The light-receiving surface 450' covers a area directly above (on +Z side of) the optical system within the head 21', especially a area directly above (on +Z side of) at least a portion of spot-size converter 43'. Here, the spot-size converter 43' is adjusted so as to leak a predetermined amount of leakage light, as explained with reference to FIGS. 4a and 4b. Accordingly, the photodiode 45' can receive the leakage light that leaks from the spot-size converter 43' at its light-receiving surface 450' as monitoring light. By using the monitoring output from the photodiode 45', monitoring of the light output of the laser diode 40' as a light source for thermal-assist can be implemented.

As described above, in the thermally-assisted magnetic recording head 21' that provides a light source for thermal-assist in the form of the light source unit 23, by mounting the photodiode 45' in the element-integration surface 2202' of the slider 22' that is joined to the light source unit 23, there can be performed the feedback adjustment of light output of the light source for thermal-assist. Further, by performing the adjustment, the light output can be adjusted according to variations in light output of the laser diode 40' caused by environmental influences and variations over time in the light output, and thus the intensity of near-field light for thermal-assist applied to the magnetic disk can be stabilized. As a result, a area on the magnetic disk in which data is to be written can be appropriately and stably heated.

Figure 6:
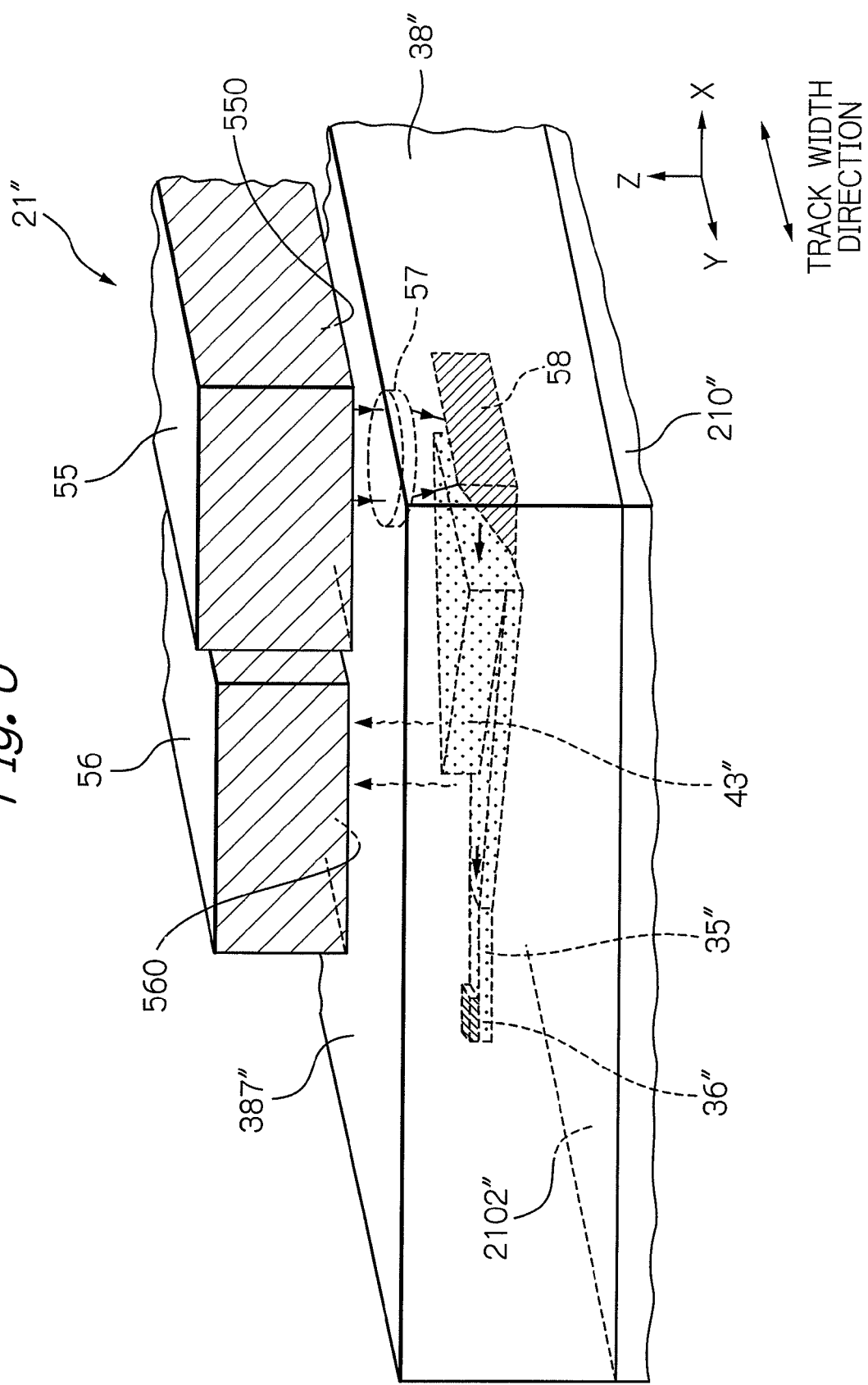
FIG. 6 shows a perspective view schematically illustrating further another embodiment of thermally-assisted magnetic recording head according to the present invention.

FIG. 6 shows a perspective view schematically illustrating further another embodiment of the thermally-assisted magnetic recording head according to the present invention.

The thermally-assisted magnetic recording head 21" depicted in FIG. 6 includes a surface-emitting laser diode 55 as a light source for thermal-assist and a photodiode 56 for monitoring light output of the light source, which are provided on the upper surface 387" of an overcoat layer 38" formed on an element-integration surface 2102" of the slider substrate 210". The surface-emitting laser diode 55 may be a semiconductor laser, such as a vertical-cavity surface-emitting laser (VCSEL) or a photonic-crystal type surface-emitting laser diode, which has a light-emitting surface 550 that can be used as the mounting surface. The light-emitting surface 550 faces the element-integration surface 2102". The photodiode 56 may be a diode having a light-receiving surface 560 which acts as a mounting surface (bottom surface).

A reflecting mirror 58, a spot-size converter 43", a waveguide 35" and a surface plasmon generator 36" are provided on the element-integration surface 2102" of the slider substrate 210" and are covered with the overcoat layer 38". A binary lens 57 may be provided between the surface-emitting laser diode 55 and the reflecting mirror 58. These elements form an optical system for generating near-field light in the head 21". The binary lens 57 is a diffraction optical element that converges laser light emitted from the light-emitting surface 550 of the surface-emitting laser diode 55. The reflecting mirror 58 is a light-path changer that redirects the laser light converged by the binary lens 57 toward the spot-size converter 43".

Further, the light-receiving surface 560 of the photodiode 56 covers a area directly above (on +Z side of) a portion of the optical system within the head 21", in particular, a area directly above (on +Z side of) at least a portion of the spot-size converter 43". The spot-size converter 43" is adjusted so as to leak a predetermined amount of leakage light as described with respect to FIGS. 4a and 4b. Accordingly, the photodiode 56 can receive the leakage light that leaks from the spot-size converter 43" at its light-receiving surface 560 as monitoring light. As a result, by using the output from the photodiode 56, there can be monitored the light output of the surface-emitting laser diode 55 functioning as a light source for thermal-assist.

The provision of the photodiode 56 on the element-integration surface 2102" together with the surface-emitting laser diode 55 enables feedback adjustment of light output of the light source for thermal-assist in the thermally-assisted magnetic recording head 21" that uses the surface-emitting laser diode 55 as a light source for thermal-assist. Further, by the adjustment of the light output of the surface-emitting laser diode 55 according to variations in light output of the surface-emitting laser diode 55 caused by environmental influences and variations over time in the light output, the intensity of near-field light for thermal-assist applied to the magnetic disk can be stabilized. Consequently, proper heating of a portion of a magnetic disk where data is to be written can be stably achieved.

Figure 7:
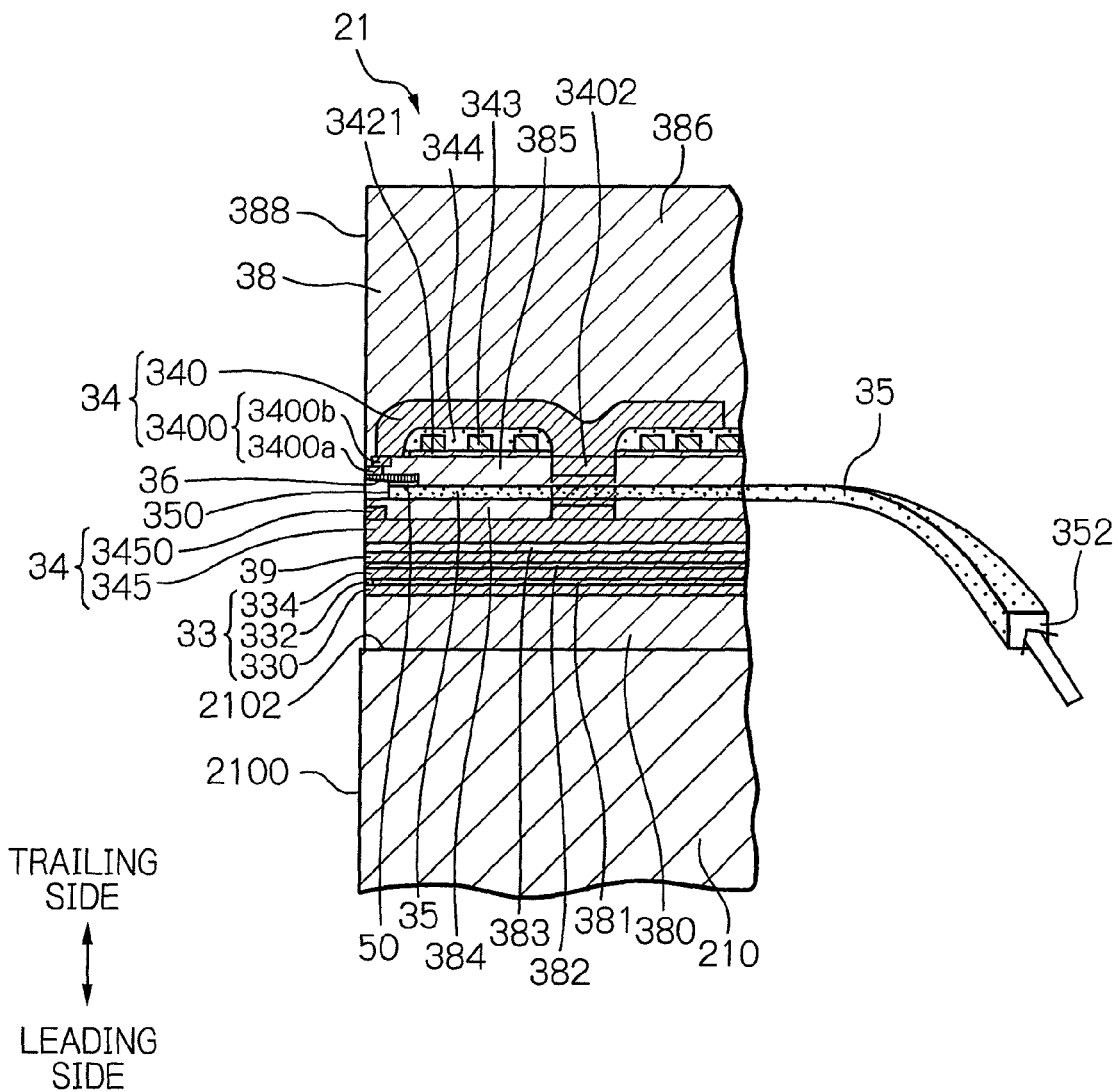
FIG. 7 shows a cross-sectional view taken by plane A in FIG. 2, schematically illustrating the configuration of the head element and its surrounding in the thermally-assisted magnetic recording head according to the present invention.

FIG. 7 shows a cross-sectional view taken by plane A in FIG. 2, schematically illustrating the configuration of the head element 32 and its surrounding in the thermally-assisted magnetic recording head 21.

As shown in FIG. 7, the MR element 33 is formed on an insulating layer 380 that is formed of an insulating material such as $Al_2O_3$ (alumina), $SiO_2$ and stacked on the element-integration surface 2102, and includes: an MR multilayer 332; and a lower shield layer 330 and an upper shield layer 334 which sandwich the MR multilayer 332 and an insulating layer 381 therebetween. The upper and lower shield layers 334 and 330 prevent the MR multilayer 332 from receiving external magnetic field as a noise. The upper and lower shield layers 334 and 330 are formed of a soft-magnetic material such as NiFe (Permalloy) and have a thickness of, for example, approximately 0.5 to 3 μm. The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes. Whereas, in the case that the MR multilayer 332 is a CIP-GMR multilayer, insulating layers are provided between the MR multilayer 332 and respective upper and lower shield layers 334 and 330; further, formed are MR lead layers that are electrically connected to the MR multilayer 332.

Referring also to FIG. 7, the electromagnetic transducer 34 is designed for perpendicular magnetic recording, and includes an upper yoke layer 340, a main magnetic pole 3400, a write coil layer 343, a coil-insulating layer 344, a lower yoke layer 345, and a lower shield 3450.

The upper yoke layer 340 is formed so as to cover the coil-insulating layer 344, and the main magnetic pole 3400 is formed on an insulating layer 385 made of an insulating material such as $Al_2O_3$ (alumina). These upper yoke layer 340 and main magnetic pole 3400 are magnetically connected with each other, and acts as a magnetic path for converging and guiding magnetic flux toward the magnetic recording layer (perpendicular magnetization layer) of the magnetic disk 10 (FIG. 1), the magnetic flux being excited by write current flowing through the write coil layer 343. The main magnetic pole 3400 includes: a first main pole portion 3400*a* reaching the head end surface 388 and having a small width $W_P$ (FIG. 9) in the track width direction; and a second main pole portion 3400*b* located on the first main pole portion 3400*a* and at the rear (+X side) of the portion 3400*a*. The small width $W_P$ of the first main pole portion 3400*a* enables the generation of a fine write magnetic field responding to higher recording density. The main magnetic pole 3400 is formed of a soft-magnetic material with a saturation magnetic flux density higher than that of the upper yoke layer 340, which is, for example, an iron alloy containing Fe as a main component, such as FeNi, FeCo, FeCoNi, FeN or FeZrN. The thickness of the first main pole portion 3400*a* is, for example, in the range of approximately 0.1 to 0.8 µm.

The write coil layer 343 is formed on an insulating layer 3421 made of an insulating material such as $Al_2O_3$ (alumina), in such a way as to pass through in one turn at least between the lower yoke layer 345 and the upper yoke layer 340, and has a spiral structure with a back contact portion 3402 as a center. The write coil layer 343 is formed of a conductive material such as Cu (copper). The write coil layer 343 is covered with a coil-insulating layer 344 that is formed of an insulating material such as a heat-cured photoresist and electrically isolates the write coil layer 343 from the upper yoke layer 340. The write coil layer 343 has a monolayer structure in the present embodiment; however, may have a two or more layered structure or a helical coil shape. Further, the number of turns of the write coil layer 343 is not limited to that shown in FIG. 7, and may be, for example, in the range from two to seven.

The back contact portion 3402 has a though-hole extending in X-axis direction, and the waveguide 35 and insulating layers that covers the waveguide 35 pass through the though-hole. In the though-hole, the waveguide 35 is away at a predetermined distance of, for example, at least 1 µm from the inner wall of the back contact portion 3402. The distance prevents the absorption of the waveguide light by the back contact portion 3402.

The lower yoke layer 345 is formed on an insulating layer 383 made of an insulating material such as $Al_2O_3$ (alumina), and acts as a magnetic path for the magnetic flux returning from a soft-magnetic under layer that is provided under the magnetic recording layer (perpendicular magnetization layer) of the magnetic disk 10. The lower yoke layer 345 is formed of a soft-magnetic material, and its thickness is, for example, approximately 0.5 to 5 µm. Further, the lower shield 3450 is a part of the magnetic path, being connected with the lower yoke layer 345 and reaching the head end surface 388. The lower shield 3450 is opposed to the main magnetic pole 3400 through the surface plasmon generator 36, and acts for receiving the magnetic flux spreading from the main magnetic pole 3400. The lower shield 3450 has a width in the track width direction greatly larger than that of the main magnetic pole 3400. This lower shield 3450 causes the magnetic field gradient between the end portion of the lower shield 3450 and the first main pole portion 3400*a* to become steeper. As a result, jitter of signal output becomes smaller, and therefore, error rates during read operations can be reduced. The lower shield 3450 is preferably formed of a material with high saturation magnetic flux density such as NiFe (Permalloy) or an iron alloy as the main magnetic pole 3400 is formed of.

Referring also to FIG. 7, laser light 53*b*, the spot size of which the spot-size converter 43 changes (reduces), enters the waveguide 35 from the light-receiving end surface 352, and propagates through the waveguide 35. The waveguide 35 extends from the light-receiving end surface 352 to the end surface 350 on the head end surface 388 side through the through-hole that is provided in the back contact portion 3402 and extends in X-axis direction. Furthermore, the surface plasmon generator 36 is a near-field optical device that transforms the laser light (waveguide light) propagating through the waveguide 35 into near-field light. A part on the head end surface 388 side of the waveguide 35 and the surface plasmon generator 36 are provided between the lower shield 3450 (lower yoke layer 345) and the main magnetic pole 3400 (upper yoke layer 340). Further, a portion of the upper surface (side surface) of the waveguide 35 on the head end surface 388 side is opposed to a portion of the lower surface (including a propagation edge 360 (FIG. 8)) of the surface plasmon antenna 36 with a predetermined distance. The sandwiched portion between these portions constitutes a buffering portion 50 having a refractive index lower than that of the waveguide 35. The buffering portion 50 acts for coupling the laser light (waveguide light) that propagates through the waveguide 35 with the surface plasmon generator 36 in a surface plasmon mode. Here, the buffering portion 50 may be a portion of an insulating layer 385 that is a part of the overcoat layer 38, or a new layer provided other than the insulating layer 385. A detailed explanation of the near-field light generating optical system including the spot-size converter 43, the waveguide 35, the surface plasmon generator 36, and the buffering portion 50 will be given later with reference to FIG. 8.

Further, also as shown in FIG. 7, an inter-element shield layer 39 is preferably provided between the MR element 33 and the electromagnetic transducer 34 (lower yoke layer 345), sandwiched by the insulating layers 382 and 383. The inter-element shield layer 39 plays a role for shielding the MR element 33 from the magnetic field generated from the electromagnetic transducer 34, and may be formed of a soft-magnetic material. Here, the insulating layers 381, 382, 383, 384, 385 and 386 constitute the overcoat layer 38.

Figure 8:
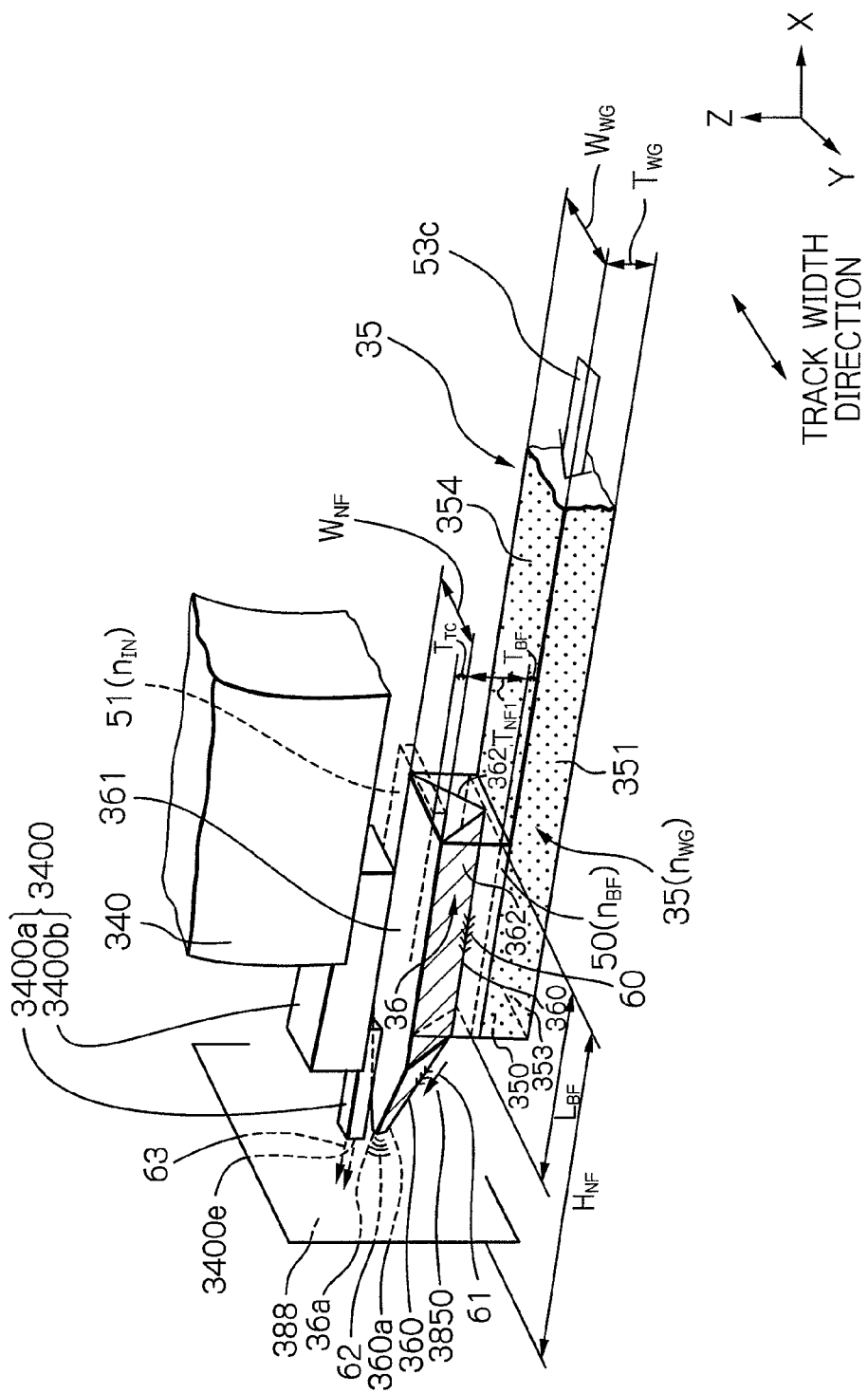
FIG. 8 shows a perspective view schematically illustrating the configuration of the waveguide, the surface plasmon generator and the main magnetic pole.

FIG. 8 shows a perspective view schematically illustrating the configuration of the waveguide 35, the surface plasmon generator 36 and the main magnetic pole 3400. In the figure, the head end surface 388 is positioned at the left side, the surface 388 including positions where write field and near-field light are emitted toward the magnetic recording medium.

As shown in FIG. 8, the configuration includes the waveguide 35 for propagating laser light (waveguide light) 53*c* used for generating near-field light toward the end surface 350, and the surface plasmon generator 36 that has a propagation edge 360 as an edge on which surface plasmon excited by the laser light (waveguide light) 53*c* propagates. The surface plasmon generator 36 further includes a near-field light generating end surface 36*a* that reaches the head end surface 388 and is a destination for the excited surface plasmon. Further, a buffering portion 50 is a portion sandwiched between a portion of the side surface 354 of the waveguide 35 and a portion of the lower surface 362 including the propagation edge 360 of the surface plasmon generator 36. That is, a portion of the propagation edge 360 is covered with the buffering portion 50. The buffering portion 50 acts for coupling the waveguide light 53*c* with the surface plasmon generator 36 in a surface plasmon mode. Further, the propagation edge 360 plays a role of propagating the surface plasmon excited by the waveguide light 53*c* to the near-field light generating end surface 36*a*. Here, side surfaces of the waveguide 35 are defined as, out of end surfaces surrounding the waveguide 35, end surfaces other than the end surface 350 on the head end surface 388 side and the light-receiving end surface 352 on the opposite side. These side surfaces serve as surfaces on which the propagating waveguide light 53c can be totally reflected in the waveguide 35 that corresponds to a core. In the present embodiment, the side surface 354 of the waveguide 35, a portion of which is in surface contact with the buffering potion 50, is the upper surface of the waveguide 35. And, the buffering portion 50 may be a portion of the overcoat layer 38 (FIG. 2), or may be provided as a new layer other than the overcoat layer 38.

Specifically, the waveguide light 53c, which has advanced to near the buffering portion 50, is involved with the optical configuration including the waveguide 35 with a refractive index $n_{WG}$, the buffering portion 50 with a refractive index $n_{BF}$ and the surface plasmon generator 36 made of a metal, and induces a surface plasmon mode on the propagation edge 360 of the surface plasmon generator 36. That is, the waveguide light couples with the surface plasmon generator 36 in a surface plasmon mode. The induction of the surface plasmon mode becomes possible by setting the refractive index n of the buffering portion 50 to be smaller than the index n of the waveguide 35 ($n_{BF}<n_{WG}$). Actually, evanescent light is excited within the buffering portion 50 under an optical boundary condition between the waveguide 35 as a core and the buffering portion 50. Then, the evanescent light couples with the fluctuation of electric charge excited on the metal surface (propagation edge 360) of the surface plasmon generator 36, and induces the surface plasmon mode, thereby there is excited surface plasmon 60. To be exact, there excited is surface plasmon polariton in this system because surface plasmon as elementary excitation is coupled with an electromagnetic wave. However, the surface plasmon polariton will be hereinafter referred to as surface plasmon for short. The propagation edge 360 is located closest to the waveguide 35 on the inclined lower surface 362 of the surface plasmon generator 36, and is just an edge where electric field tends to converge; thus surface plasmon can easily be excited on the edge 360.

In the laser diode and optical system as shown in FIGS. 2, 7 and 8, the laser light emitted from the light-emitting surface 400 of the laser diode 40 preferably has TM-mode polarization in which the oscillation direction of electric field of the laser light is Z-axis direction. Further, the waveguide light 53c accordingly have a linear polarization in which the oscillation direction of electric field of the laser light is Z-axis direction, that is, perpendicular to the layer surface of the waveguide 35. Setting the polarization enables the waveguide light 53c propagating through the waveguide 35 to be coupled with the surface plasmon generator 36 in a surface plasmon mode.

Further, as shown in FIG. 8, the near-field light generating end surface 36a of the surface plasmon generator 36 is located close to the end surface 3400e of the main magnetic pole 3400 reaching the head end surface 388. And the propagation edge 360 extends to the near-field light generating end surface 36a. Further, in the present embodiment, a portion of the propagation edge 360 on the end surface 36a side (on the head end surface 388 side) has a shape of straight line or curved line extending so as to become closer to the end surface 361 of the surface plasmon generator 36 as going toward the near-field light generating end surface 36a, the end surface 361 being opposite to the propagation edge 360. Surface plasmon 60 excited on the propagation edge 360 propagates on the propagation edge 360 along the direction shown by arrows 61. The propagation edge 360 is made rounded to prevent surface plasmon from running off from the edge 360, and thus to prevent the degradation of light use efficiency.

The surface plasmon generator 36, in the present embodiment, tapers in the height direction (Z-axis direction) near the head end surface 388 toward the near-field light generating end surface 36a. Further, the surface plasmon generator 36 has, in the present embodiment, a cross-section taken by YZ plane with a triangular shape, and the near-field light generating end surface 36a especially has a predetermined triangular shape (FIG. 9) in which one apex is the end of the propagation edge 360. Thus, surface plasmon 60 propagating on the propagation edge 360 reaches the near-field light generating end surface 36a having an apex 360a as a destination of the edge 360. As a result, the surface plasmon 60, namely, electric field converges in the near-field light generating end surface 36a. Thereby near-field light 62 is emitted from the end surface 36a toward the magnetic recording layer of the magnetic disk 10, and reaches the surface of the magnetic disk 10 to heat a portion of the magnetic recording layer of the disk 10. This heating reduces the anisotropic magnetic field (coercive force) of the portion to a value with which write operation can be performed. Immediately after the heating, write field 63 generated from the main magnetic pole 3400 is applied to the portion to perform write operation. Thus, the thermally-assisted magnetic recording can be accomplished.

Meanwhile, in a conventional case in which a plasmon antenna provided on the end surface of a head is directly irradiated with laser light propagating through the waveguide without using a surface plasmon generator, most of the irradiated laser light has been converted into thermal energy within the plasmon antenna. As a result, the plasmon antenna has been brought to a very high temperature, for example, 500° C. (degrees Celsius). On the contrary, in a thermally-assisted magnetic recording with the surface plasmon generator 36 according to the present invention, a surface plasmon mode is utilized, and near-field light 62 is generated by propagating surface plasmon 60 toward the head end surface 388. This brings the temperature at the near-field light generating end surface 36a to, for example, about 100° C. during the emission of near-field light, which is greatly reduced compared to the conventional. This reduction of temperature allows the protrusion of the near-field light generating end surface 36a toward the magnetic disk 10 to be suppressed; thereby a favorable thermally-assisted magnetic recording can be achieved.

Furthermore, the length $L_{BF}$ of the whole buffering portion 50, that is, the portion through which the waveguide 35 and the surface plasmon generator 36 are coupled with each other in a surface plasmon mode, is preferably larger than the wavelength $\lambda_L$ of the laser light. In this preferable case, the coupling portion has an area markedly larger than a so-called "focal region" in the case that, for example, laser light is converged on a buffering portion and a surface plasmon generator and coupled in a surface plasmon mode. Therefore, a configuration quite different from the system including such "focal region" can be realized in the present invention; thus, very stable coupling in the surface plasmon mode can be achieved. The induction of surface plasmon mode is disclosed in, for example, Michael Hochberg, Tom Baehr-Jones, Chris Walker & Axel Scherer, "Integrated Plasmon and dielectric waveguides", OPTICS EXPRESS Vol. 12, No. 22, pp 5481-5486 (2004), U.S. Pat. No. 7,330,404 B2, and U.S. Pat. No. 7,454,095 B2.

Referring also to FIG. 8, the waveguide 35 and the buffering portion 50 are provided on −Z side (on the leading side), that is, on the opposite side to the main magnetic pole 3400 in relation to the surface plasmon generator 36. As a result, the propagation edge 360 is also positioned on the opposite side to the main magnetic pole 3400 within the surface plasmon generator 36. By applying such a configuration, even when a distance between the end surface 3400e generating write field of the main magnetic pole 3400 and the end surface 36*a* emitting near-field light is sufficiently small, preferably 100 nm or less, the waveguide 35 can be separated sufficiently apart from the main magnetic pole 3400. As a result, there can be avoided a situation in which a part of the waveguide light 53 is absorbed into the main magnetic pole 3400 made of metal and the amount of light to be converted into near-field light is reduced.

Further, in the present embodiment, the waveguide 35 has a cross-section taken by YZ-plane of a rectangular or trapezoidal shape, and is a linear light path with a constant width in the track width direction (Y-axis direction) near the head end surface 388. The width $W_{WG}$ in the track width direction (Y-axis direction) of a portion of the waveguide 35 near the end surface 350 on the head end surface 388 side may be, for example, in the range approximately from 0.3 to 0.7 μm. Further, the thickness $T_{WG}$ (in Z-axis direction) of the waveguide 35 may be, for example, in the range approximately from 0.3 to 0.7 μm.

Further, the side surfaces of the waveguide 35: the upper surface 354, the lower surface 353, and both the side surfaces 351 in the track width direction (Y-axis direction) have a surface contact with the overcoat layer 38 (FIG. 2), that is, the insulating layers 384 and 385 (FIG. 7), except a portion having a surface contact with the buffering portion 50. Here, the waveguide 35 is formed of a material with a refractive index $n_{WG}$ higher than the refractive index $n_{OC}$ of the constituent material of the overcoat layer 38, made by using, for example, a sputtering method. For example, in the case that the wavelength $\lambda_L$ of the laser light is 600 nm and the overcoat layer 38 is formed of SiO$_2$ (silicon dioxide: n=1.5), the waveguide 35 can be formed of, for example, Al$_2$O$_3$ (alumina: n=1.63). Further, in the case that the overcoat layer 38 is formed of Al$_2$O$_3$ (n=1.63), the waveguide 35 can be formed of, for example, SiO$_x$N$_y$ (n=1.7-1.85), Ta$_2$O$_5$ (n=2.16), Nb$_2$O$_5$ (n=2.33), TiO (n=2.3-2.55) or TiO$_2$ (n=2.3-2.55). The just-described material structure of the waveguide 35 enables the propagation loss of laser light 53*c* to be reduced due to the excellent optical characteristics of the constituent material. Further, the waveguide 35 acting as a core can provide the total reflection in all the side surfaces of the waveguide 35 due to the existence of the overcoat layer 38 acting as a clad. As a result, more amount of laser light 53*c* can reach the position of the buffering portion 50, which improves the propagation efficiency of the waveguide 35.

In the present embodiment, a portion of the propagation edge 360 which is not opposed to the waveguide 35 (buffering portion 50) may be covered with a constituent material of the overcoat layer 38 having a refractive index $n_{OC}$, for example, a portion 3850 of the insulating layer 385. Further, the waveguide 35 is preferably a single-mode waveguide to stabilize the wavenumber K of the waveguide light propagating through the waveguide 35 and excite surface plasmon reliably. Here, the single-mode waveguide is a waveguide in which the beam cross-section of the laser light propagating within the waveguide has a shape of circle or ellipsoid, and the intensity of light on the cross-section is distributed as a single-peak distribution, especially a Gaussian.

The surface plasmon generator 36 is preferably formed of a conductive material of, for example, a metal such as Ag, Au, pd, Pt, Rh, Ir, Ru, Cu or Al, or an alloy made of at least two of these elements, especially an alloy with Ag as a main component. Further, the surface plasmon generator 36 can have a width $W_{NF}$ in the track width direction (Y-axis direction) of the upper surface 361, the width $W_{NF}$ being sufficiently smaller than the wavelength of the laser light 53*c*, and being in the range of, for example, approximately 10 to 100 nm. And the surface plasmon generator 36 can have a thickness $T_{NF1}$ (in Z-axis direction) sufficiently smaller than the wavelength of the laser light 53*c*, the thickness $T_{NF1}$ being in the range of, for example, approximately 10 to 100 nm. Further, the length (height) $H_{NF}$ (in X-axis direction) can be set to be in the range of, for example, approximately 0.8 to 6.0 μm.

The buffering portion 50 is formed of a dielectric material having a refractive index $n_{BF}$ lower than the refractive index $n_{WG}$ of the waveguide 35. For example, when the wavelength $\lambda_L$ of the laser light is 600 nm and the waveguide 35 is formed of Al$_2$O$_3$ (alumina: n=1.63), the buffering portion 50 can be formed of SiO$_2$ (silicon dioxide: n=1.46). Further, when the waveguide 35 is formed of Ta$_2$O$_5$ (n=2.16), the buffering portion 50 can be formed of SiO$_2$ (n=1.46) or Al$_2$O$_3$ (n=1.63). In these cases, the buffering portion 50 can be a portion of the overcoat layer 38 (FIG. 2) serving as a clad made of SiO$_2$ (n=1.46) or Al$_2$O$_3$ (n=1.63). Further, the length $L_{BF}$ (in X-axis direction) of the buffering portion 50, namely, the length of a portion sandwiched between the side surface 354 of the waveguide 35 and the propagation edge 360, is preferably in the range of 0.5 to 5 μm, and is preferably larger than the wavelength $\lambda_L$ of the laser light 53*c*. Further, the thickness $T_{BF}$ (in Z-axis direction) of the buffering portion 50 is preferably in the range of 10 to 200 nm.

Also as shown in FIG. 8, a thermal conduction layer 51 is preferably provided on the head end surface 388 side between the surface plasmon generator 36 and the first main pole portion 3400*a*. The thermal conduction layer 51 is formed of, for example, an insulating material such as AlN, SiC or DLC, which has higher thermal conductivity compared with that of the overcoat layer 38. Providing the thermal conduction layer 51 allows a part of the heat generated when the surface plasmon generator 36 emits near-field light to get away to the main magnetic pole 3400 through the thermal conduction layer 51. That is, the main magnetic pole 3400 can be utilized as a heatsink. The thickness $T_{TC}$ of the thermal conduction layer 51 corresponds to a distance $D_{N-P}$ (FIG. 9) on the head end surface 388 between the near-field light generating end surface 36*a* and the end surface 3400*e* of the main magnetic pole 3400, and is preferably set to be a sufficiently small value of 100 nm or less. Further, the refractive index $n_{IN}$ of the thermal conduction layer 51 is set equal to or lower than the refractive index $n_{BF}$ of the buffering portion 50 that covers the propagation edge 360 of the surface plasmon generator 36. This allows surface plasmon to propagate stably on the propagation edge 360.

As shown also in FIG. 8, the main magnetic pole 3400 includes; the first main pole portion 3400*a* having the end surface 3400*e* reaching the head end surface 388; and the second main pole portion 3400*b*, the end portion of which on the head end surface 388 side is stacked on and overlapped with a portion of the first main pole portion 3400*a* on the opposite side to the head end surface 388. Further, the end portion of the upper yoke layer 340 on the head end surface 388 side is stacked on and overlapped with a portion of the second main pole portion 3400*b* on the opposite side to the head end surface 388. Namely, the upper yoke layer 340 and the main magnetic pole 3400 are formed in such a way as to become closer to the near-field light generating end surface 36*a* of the surface plasmon generator 36 when going toward the head end surface 388. As a result, the end surface 3400*e* of the main magnetic pole 3400 can be made sufficiently close to the near-field light generating end surface 36*a*, under the condition that the upper yoke layer 340 and the main magnetic pole 3400 are at a sufficiently large distance from the waveguide 35.

Figure 9:
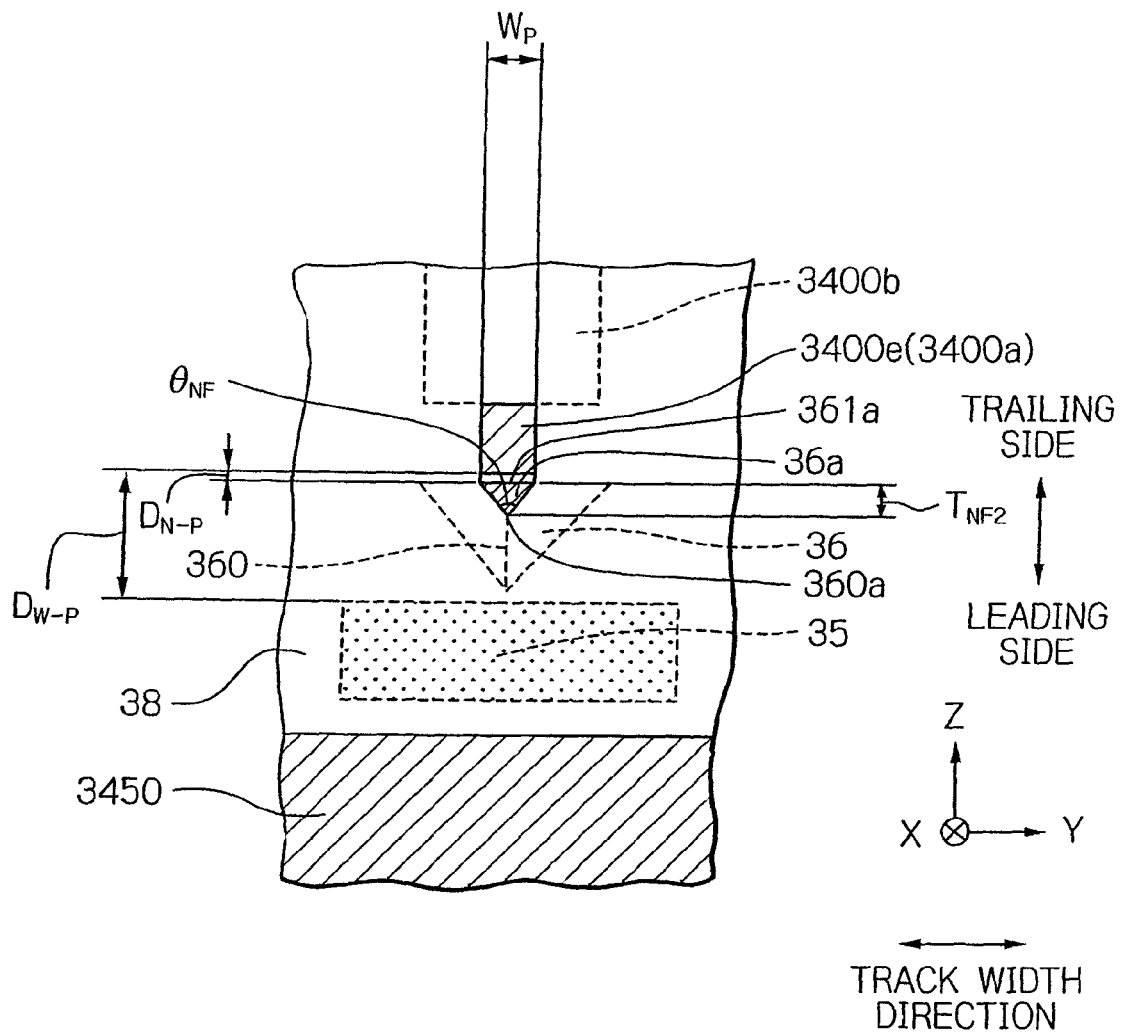
FIG. 9 shows a plan view illustrating the shapes of the end surfaces of the surface plasmon generator and the electromagnetic transducer on the head end surface or in its vicinity.

FIG. 9 shows a plan view illustrating the shapes of the end surfaces of the surface plasmon generator 36 and the electromagnetic transducer 34 on the head end surface 388 or in its vicinity.

As shown in FIG. 9, the main magnetic pole 3400 (the first main pole portion 3400a) and the lower shield 3450 of the electromagnetic transducer 34 reach the head end surface 388. The shape of the end surface 3400e of the main magnetic pole 3400 on the head end surface 388 is, for example, a rectangle, a square or a trapezoid. Here, the above-described width $W_P$ is a length of the edge along the track width direction (Y-axis direction) of the end surface 3400e of the main magnetic pole 3400, and provides the width of the distribution of write field in track width direction (Y-axis direction). The width $W_P$ can be set to be in the range of, for example, approximately 0.05 to 0.5 μm.

Moreover, on the head end surface 388, the near-field light generating end surface 36a of the surface plasmon generator 36 is positioned close to the end surface 3400e of the main magnetic pole 3400, on the leading side (−Z side) of the end surface 3400e, and on the trailing side (+Z side) of the lower shield 3450. The near-field light generating end surface 36a has a shape of isosceles triangle that has a bottom edge 361a on the trailing side (+Z side) and a vertex on the leading side (−Z side) as an end 360a of the propagation edge 360. Here, a distance $D_{N-P}$ between the near-field light generating end surface 36a and the end surface 3400e is set to be a sufficiently small value of, for example, 100 nm or less. In the thermally-assisted magnetic recording, the near-field light generating end surface 36a functions as a main heating action part, and the end surface 3400e functions as a writing action part. Therefore, by setting the distance $D_{N-P}$ as described above, write field with a sufficiently large gradient can be applied to a portion of the magnetic recording layer of the magnetic disk, the portion having been sufficiently heated. This enables a stable thermally-assisted write operation to be reliably achieved. Further, according to the configuration shown in FIG. 8, a distance $D_{W-P}$ between the waveguide 35 and the main magnetic pole 3400 is made sufficiently large while the distance $D_{N-P}$ is set to a minute value as described above. That is, the waveguide 35 can be positioned sufficiently away apart from the main magnetic pole 3400. As a result, there can be avoided a situation in which a part of the laser light is absorbed into the main magnetic pole 3400 made of metal, and the amount of light to be converted into near-field light is reduced.

FIGS. 10a and 10b show schematic views illustrating alternatives in thermal-assist of the thermally-assisted magnetic recording head according to the present invention.

According to the alternative embodiment shown in FIG. 10a in the vicinity of the head end surface 388, the configuration within an electromagnetic transducer, including an upper yoke layer 340, a main magnetic pole 3400 and a lower shield 3450, is the same as that of the embodiment shown in FIG. 7, except that a surface plasmon generator for generating near-field light is not provided in the alternative embodiment. Instead, the end surface 700 of a waveguide 70 extends to the head end surface 388. Laser light emitted from a laser diode 40 travels through a spot-size converter 43 and the waveguide 70 and is directly emitted through the end surface 700. The emitted light heats the magnetic recording layer of the magnetic disk 10, thereby accomplishing thermal-assist. This optical system can be used to accomplish thermally-assisted magnetic recording as in the embodiments described above.

The alternative embodiment shown in FIG. 10b adds a plasmon antenna 72 made of a metal piece to the configuration of the alternative embodiment shown in FIG. 10a. The plasmon antenna 72 is disposed at the end surface 710 of a waveguide 71 in such a manner that the plasmon antenna 72 is exposed in the head end surface 388. When the other end of the waveguide 71 is irradiated with waveguide light transmitted through the waveguide 71, the plasmon antenna 72 emits near-field light from its exposed end surface toward a magnetic disk 10. The near-field light heats the magnetic recording layer of the magnetic disk 10, thereby accomplishing thermal-assist. While this optical system has a problem that the plasmon antenna 72 can become extremely hot as described above, the optical system also can be used to perform thermally-assisted magnetic recording.

Various other alternative embodiments are possible in addition to the alternative embodiments shown in FIGS. 10a and 10b. In any of the embodiments, by detecting leakage light emitted from an optical system for applying a light for thermal-assist with use of a light detector provided in the element-integration surface, which has a light-receiving surface that covers the area directly above at least a portion of the optical system, there can be monitored the output of a light source for thermal-assist.

Figure 11A:
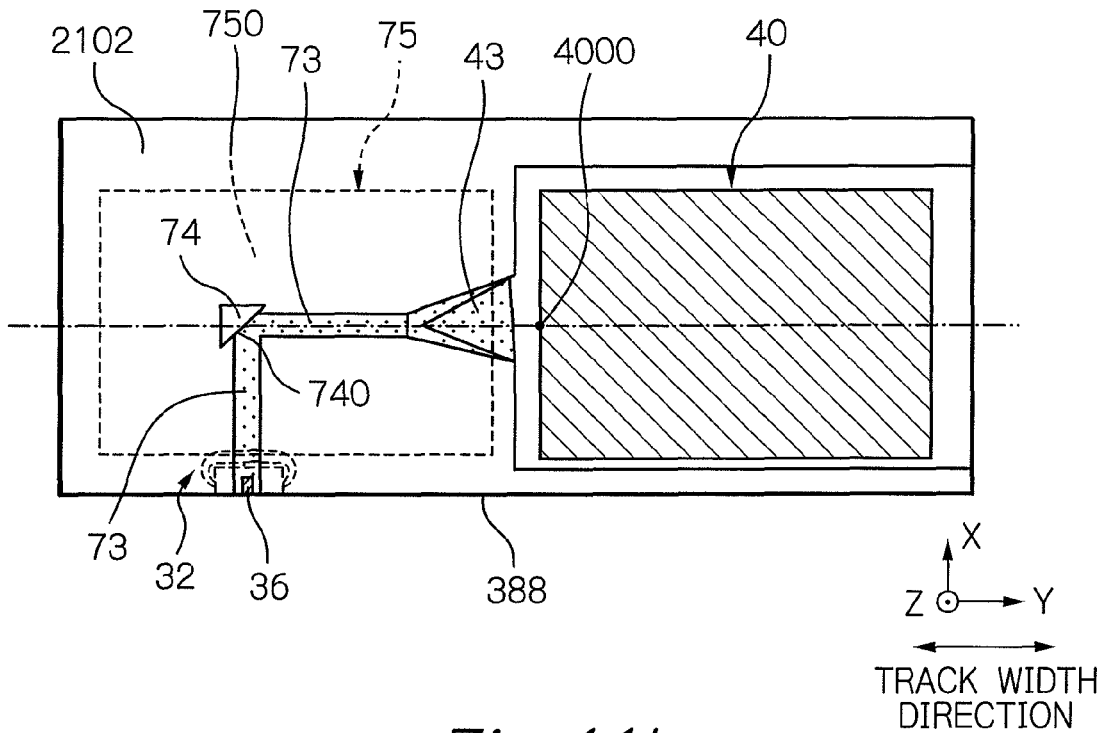
FIGS. 11a and 11b show schematic views illustrating various embodiments of the thermally-assisted magnetic recording head according to the present invention.
Figure 11B:
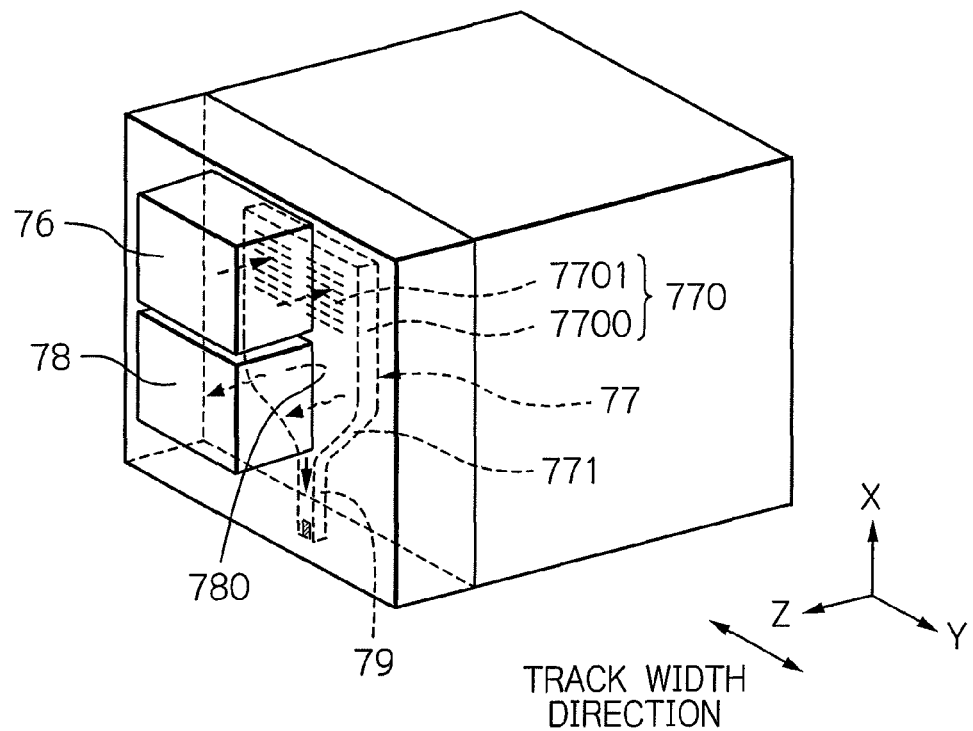

FIGS. 11a and 11b show schematic views illustrating various embodiments of the thermally-assisted magnetic recording head according to the present invention.

According to the embodiment shown in FIG. 11a, laser light emitted from a laser diode 40 travels through a spot-size converter 43 and is incident at a portion of a waveguide 73 that extends in Y-axis direction, as in the embodiment shown in FIG. 2. The waveguide 73 further has a portion extending in X-axis direction. A mirror 74 functioning as a light-path changing means is provided between the two portions of the waveguide 73. The mirror 74 redirects waveguide light that has propagated through the portion in Y-axis direction of the waveguide 73 toward the head end surface 388, so that the waveguide light travels through the portion in X-axis direction of the waveguide 73. The mirror 74 may be a triangular prism in shape, made of a metal such as Au, Cu or NiFe, for example, extending in Z-axis direction and having a reflecting surface 740 that reflects laser light. The constituent material of the mirror 74 and the surface conditions, for example roughness, of the reflecting surface 740 can be adjusted to control light scattered from the reflecting surface 740 to provide a predetermined amount of leakage light.

A photodiode 75 has a mounting surface (bottom surface) that is a light-receiving surface 750. The light-receiving surface 750 covers the area directly above (on +Z side of) the mirror 74. Accordingly, the photodiode 75 can receive leakage light from the mirror 74 as monitoring light at its light-receiving surface 750. Consequently, the monitoring output from the photodiode 75 can be used to make feedback adjustment of the light output of the laser diode 40 acting as a light source for thermal-assist. In the present embodiment, an optical prism can be used in place of the mirror 74 as a light-path changing means. In that case, surface conditions, for example roughness, of the incident surface, total reflection surface and exit surface of the prism can be adjusted to control light scattered from the prism other than totally reflected light to provide a predetermined amount of leakage light.

According to the embodiment shown in FIG. 11b, laser light emitted from a surface-emitting laser diode 76 enters a grating coupler 77. The grating coupler 77 is a light-path changer that redirects the laser light to a waveguide 79 that leads to the opposed-to-medium surface. The grating coupler 77 includes a light-receiving part 770 and a spot-size-converting part 771. The light-receiving part 770 includes a core layer 7700 on which formed is a micro-pattern 7701 with a predetermined grid made of a dielectric material such as $TiO_x$ that has a refractive index well higher than a surrounding overcoat layer is formed. The micro-pattern 7701 and the spot-size-converting part 771 can be formed with a high accuracy by thin-film micro-fabrication technology, for example. During the fabrication, the position and shape of the micropattern 7701 and the degree of reduction of the spot diameter of light in the spot-size-converting part 771 are adjusted so that a predetermined amount of leakage light can be provided.

A photodiode 78 has a mounting surface (bottom surface) that is a light-receiving surface 780. The light-receiving surface 780 covers the area directly above (on +Z side of) at least a portion of the grating coupler 77. Accordingly, the photodiode 78 can receive leakage light from the grating coupler 77 as monitoring light at its light-receiving surface 780. Consequently, the monitoring output from the photodiode 78 can be used to make feedback adjustment of the light output of the surface-emitting laser diode 76 acting as a light source for thermal-assist.

Figure 12:
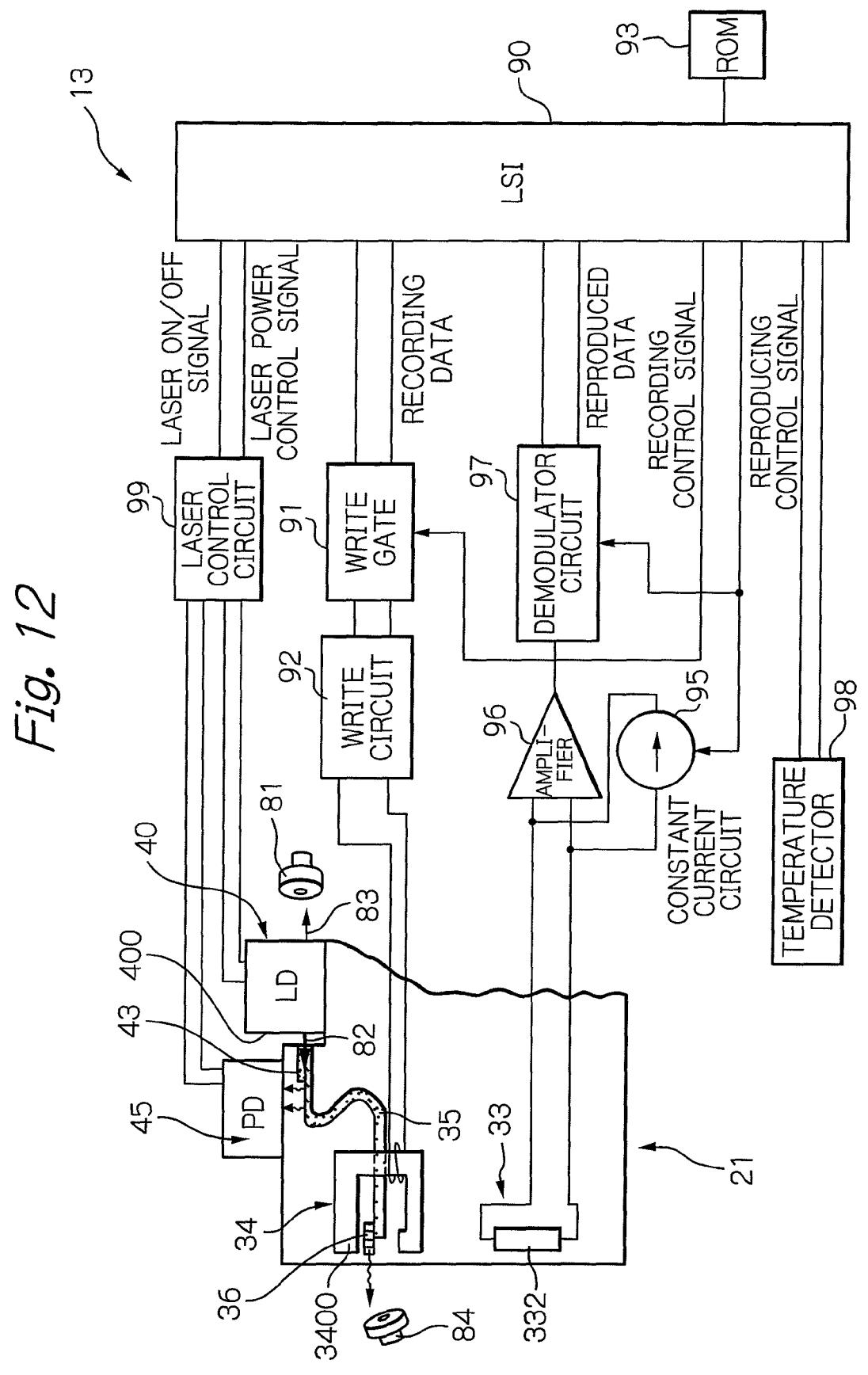

FIG. 12 shows a block diagram illustrating the circuit structure of the recording/reproducing and light-emission control circuit 13 of the magnetic disk apparatus shown in FIG. 1.

According to FIG. 12, reference numeral 90 indicates a control LSI, 91 indicates a write gate for receiving recording data from the control LSI 90, 92 indicates a write circuit, 93 indicates a ROM that stores a control table or the like for controlling the value of operating current supplied to the laser diode 40, 95 indicates a constant current circuit for supplying sense current to the MR element 33, 96 indicates an amplifier for amplifying the output voltage from the MR element 33, 97 indicates a demodulator circuit for outputting reproduced data to the control LSI 90, 98 indicates a temperature detector, and 99 indicates a control circuit for controlling the laser diode 40, respectively.

The recording data outputted from the control LSI 90 is supplied to the write gate 91. The write gate 91 supplies recording data to the write circuit 92 only when a recording control signal outputted from the control LSI 90 instructs a write operation. The write circuit 92 applies write current according to this recording data to the write coil layer 343, and then a write operation is performed onto the magnetic disk with write field generated from the main magnetic pole 3400. Further, a constant current flows from the constant current circuit 95 into the MR multilayer 332 only when the reproducing control signal outputted from the control LSI 90 instructs a read operation. The signal reproduced by the MR element 33 is amplified by the amplifier 96, demodulated by the demodulator circuit 97, and then, the obtained reproduced data is outputted to the control LSI 90.

A laser control circuit 99 receives a laser ON/OFF signal and a laser power control signal that are outputted from a control LSI 90. When the laser ON/OFF signal indicates an ON operation, an operating current greater than or equal to an oscillation threshold is applied to a laser diode 40. This causes the laser diode 40 to emit light and the emitted laser light propagates through a spot-size converter 43 and a waveguide 35 to become coupled to a surface-plasmon generator 36 in a surface plasmon mode. As a result, near-field light is emitted from an end of the surface-plasmon generator 36 and is applied to the magnetic recording layer of a magnetic disk 10 to heat the magnetic recording layer.

The operating current is controlled to a value that causes the laser diode 40 to emit laser light of an intensity specified by the laser power control signal. Specifically, a photodiode 45 measures and monitors the output from the laser diode 40 and sends a monitoring output (measured value) to the laser control circuit 99. The laser control circuit 99 uses the measured value to make feedback adjustment for controlling the operating current applied to the laser diode 40 to cause the laser diode 40 to emit laser light of the intensity specified by the laser power control signal.

For the feedback adjustment, preferably the relationship between the intensity of laser light 82 emitted from the laser diode 40 and the monitoring output from the photodiode 45 is determined in advance. The relationship is affected by the propagation efficiency of the optical system in the head 21. Therefore, the propagation efficiency of the optical elements such as spot-size converter 43 that constitute the optical system is adjusted, as described above, so that the optical system emanates a predetermined amount of leakage light. This adjustment can provide the relationship that enables light for thermal-assist with an adequate intensity to be generated while appropriately monitoring the output light.

To determine the above-described relationship between the intensity of the laser light 82 for thermal-assist and the monitoring output from the photodiode 45, it is also preferable to measure the relationship between the intensity of laser light 83 emitted from the end surface of the edge-emitting laser diode 40 on the side opposite to the end surface 400 and the monitoring output of the photodiode 45. The intensity of the laser light 83 can be detected with a light detector 81. The intensity ratio between the rear output 83 and front output 82 of the edge-emitting laser diode 40 is typically set to a predetermined value in the range of 2 to 25%, for example, depending on the design of structure in the diode 40. Therefore, the relationship between the intensity of the laser light 82 and the monitoring output from the photodiode 45 can be determined by obtaining the relationship between the intensity of the laser light 83 and the monitoring output of the photodiode 45. The relationship can be determined after the laser diode 40 is disposed on the element-integration surface 2102, that is, after manufacturing the head 21, as well.

The control LSI 90 generates the laser ON/OFF signal according to the timing of recording/reproducing operations, and determines the value of the laser power control signal by referring the value of temperature in the magnetic recording layer of the magnetic disk or the like, which is measured by the temperature detector 98, based on the control table in the ROM 93. Here, the control table may include data about the relationship between the operating current value and the mount of temperature increase due to thermal-assist operation in the magnetic recording layer, and data about the temperature dependence of the anisotropic magnetic field (coercive force) of the magnetic recording layer, as well as data about the temperature dependences of the oscillation threshold value and the characteristics of light output power vs. operating current. Thus, by providing the system of the laser ON/OFF signal and the laser power control signal independently from the recording/reproducing control signal system, it becomes possible to realize not only a current supply to the laser diode 40 linked simply with the recording operation but also more diversified current supply modes.

Obviously, the circuit structure of the recording/reproducing and light-emission control circuit 13 is not limited to the structure shown in FIG. 12. It is also possible to specify write and read operations by using signals other than the recording control signal and reproducing control signal.

Further, the laser control circuit 99 of the recording/reproducing and light-emission control circuit 13 can be used to perform head screening inspection to determine whether the manufactured thermally-assisted magnetic recording head 21 is acceptable or not. Before the screening inspection, the relationship between the intensity of laser light 82 emitted from the laser diode 40 and the monitoring output of the photodiode 45 is determined. For the determination, the intensity of laser light 82 can be estimated by measuring the intensity of the laser light 83 emitted from the opposite end surface with a light detector 81 as described above. Then, a light detector 84 is used to measure the intensity of output light (near-field light) for thermal-assist emitted from the optical system including the spot-size converter 43, the waveguide 35, and the surface plasmon generator 36 in the manufactured head 21. Based on the measured value and the intensity of the laser light 82 calculated from measured monitoring output of the photodiode 45, the light use efficiency of the optical system is calculated. If the calculated light use efficiency is higher than or equal to a predetermined reference value, the head 21 is determined to be acceptable. From the foregoing, it is appreciated that the head screening inspection can be conducted to determine whether the optical system of the thermally-assisted magnetic recording head 21 is acceptable or not.

According to the present invention, the light-receiving surface of the light detector, such as a photodiode, provided on the element-integration surface of the slider substrate covers the area directly above at least a portion of the optical system also provided on the element-integration surface. Therefore, with the light detector, light leaking from the optical system can be detected as monitoring light. Consequently, feedback adjustment of light output of the light source for thermal-assist can be performed. Furthermore, by the feedback adjustment, light output can be adjusted according to variations in light output from the light source caused by environmental influences and variations over time in the light output, thereby stabilizing the intensity of the light for thermal-assist applied to the magnetic recording medium. As a result, proper heating of an area of the magnetic recording medium where data is to be written can be stably achieved. Thus, the present invention enables a good thermally-assisted magnetic recording to be achieved, and can contribute to achieving a high recording density, for example, greater than 1 Tbits/in$^2$.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thermally-assisted magnetic recording head comprising:
    a substrate including an element-integration surface;
    a light source;
    a write head element configured to generate a write field;
    an optical system configured to guide a light emitted from the light source to a vicinity of an end of the write head element, the end reaching an opposed-to-medium surface of the write head element; and
    a light detector for monitoring an output of the light source, the light detector being provided such that the optical system is located between the element-integration surface of the substrate and the light detector with regard to a direction perpendicular to the element-integration surface, the light detector comprising a light-receiving surface covering at least a portion of the optical system from the direction perpendicular to the element-integration surface.

2. The thermally-assisted magnetic recording head as claimed in claim 1, wherein the optical system includes a spot-size converter configured to change a spot size of propagating light, and the light-receiving surface covers at least a portion of the spot-size converter from the direction perpendicular to the element-integration surface.

3. The thermally-assisted magnetic recording head as claimed in claim 2, wherein the spot-size converter is adjusted so as to emit a predetermined amount of leakage light.

4. The thermally-assisted magnetic recording head as claimed in claim 1, wherein the optical system includes a waveguide, at least a portion of which curves and extends in such a manner that a light entering the waveguide changes traveling direction to reach an end portion of the waveguide on the opposed-to-medium surface side, and the light-receiving surface covers at least a portion of the waveguide from the direction perpendicular to the element-integration surface.

5. The thermally-assisted magnetic recording head as claimed in claim 4, wherein the waveguide is adjusted so as to emit a predetermined amount of leakage light.

6. The thermally-assisted magnetic recording head as claimed in claim 1, wherein the optical system includes a diffraction optical element and/or a light-path changer, and the light-receiving surface covers at least a portion of the diffraction optical element and/or the light-path changer from the direction perpendicular to the element-integration surface.

7. The thermally-assisted magnetic recording head as claimed in claim 1, wherein the light source is an edge-emitting laser diode.

8. The thermally-assisted magnetic recording head as claimed in claim 1, wherein the head comprises: a slider including the write head element, the optical system and the light detector; and a light source unit joined to the slider and including the light source.

9. The thermally-assisted magnetic recording head as claimed in claim 1, wherein the light source is a surface-emitting laser diode provided such that an emitting surface of the surface-emitting laser diode is opposed to the element-integration surface.

10. The thermally-assisted magnetic recording head as claimed in claim 1, wherein a center of gravity of a system consisting of the light source and the light detector is on a center line of the element-integration surface in a track width direction.

11. The thermally-assisted magnetic recording head as claimed in claim 1, wherein the optical system comprises a near-field optical device configured to receive a light propagating through the optical system and to emit a near-field light from an end that reaches an opposed-to-medium surface.

12. The thermally-assisted magnetic recording head as claimed in claim 11, wherein the near-field optical device is a surface plasmon generator comprising an edge extending to an end that reaches the opposed-to-medium surface, the edge propagating a surface plasmon excited by the light propagating through the optical system.

13. A head gimbal assembly comprising a thermally-assisted magnetic recording head as claimed in claim 1 and a suspension that supports the thermally-assisted magnetic recording head, wherein the suspension comprises a load beam, a flexure with elasticity fixed to the load beam and a base plate provided on a base portion of the load beam, and wherein the thermally-assisted magnetic recording head is fixed to the flexure.

14. A magnetic recording apparatus comprising: at least one head gimbal assembly as claimed in claim 13; at least one magnetic recording medium; and a recording and light-emission control circuit configured to control light-emission operations of the light source by using a monitor output from the light detector, and to control write operations that the thermally-assisted magnetic recording head performs to the at least one magnetic recording medium.

15. A method for controlling light-emission operations of the light source in the thermally-assisted magnetic recording head as claimed in claim 1, comprising the steps of:
   determining a relationship between an intensity of a light emitted from the light source and a monitoring output from the light detector in advance; and
   controlling an intensity of the light emitted from the light source, based on an actually-measured monitor output of the light detector, with use of the determined relationship.

16. The method as claimed in claim 15, wherein the light source is an edge-emitting laser diode, and to determine the relationship, there is measured a relationship between an intensity of a light emitted from an end surface of the laser diode on the side opposite to an end surface from which the monitored light is emitted and a monitoring output of the light detector.

17. A method for screening the thermally-assisted magnetic recording heads as claimed in claim 1, comprising the steps of:
   determining a relationship between an intensity of a light emitted from the light source and a monitoring output from the light detector in advance;
   measuring an intensity of the output light emitted from the light source; then calculating a light use efficiency of the optical system in a head, based on a monitoring output of the light detector measured at the time of measuring the intensity of the emitted output light; and
   determining the head to be acceptable if the calculated light use efficiency is higher than or equal to a predetermined reference value.

18. A thermally-assisted magnetic recording head comprising:
   a substrate including an element-integration surface;
   a light source;
   a write head element configured to generate a write field;
   an optical system configured to guide a light emitted from the light source to a vicinity of an end of the write head element, the end reaching an opposed-to-medium surface of the write head element; and
   a light detector for monitoring an output of the light source, the light detector provided such that the optical system is located between the element-integration surface of the substrate and the light detector with regard to a direction perpendicular to the element-integration surface, the light detector comprising a light-receiving surface which extends in parallel to the element-integration surface and which covers at least a portion of the optical system from the direction perpendicular to the element-integration surface.

* * * * *